US012108214B2

(12) United States Patent
De Haan et al.

(10) Patent No.: US 12,108,214 B2
(45) Date of Patent: Oct. 1, 2024

(54) HEARING DEVICE ADAPTED TO PROVIDE AN ESTIMATE OF A USER'S OWN VOICE

(71) Applicant: Oticon A/S, Smørum (DK)

(72) Inventors: Jan M. De Haan, Smørum (DK); Mirjana Adnadjevic, Smørum (DK); Svend Feldt, Ballerup (DK)

(73) Assignee: Oticon A/S, Smørum (DK)

( * ) Notice: Subject to any disclaimer, the term of this patent is extended or adjusted under 35 U.S.C. 154(b) by 270 days.

(21) Appl. No.: 17/574,773

(22) Filed: Jan. 13, 2022

(65) Prior Publication Data

US 2022/0141598 A1 May 5, 2022

Related U.S. Application Data

(62) Division of application No. 16/826,017, filed on Mar. 20, 2020, now Pat. No. 11,259,127.

(51) Int. Cl.
*H04R 25/00* (2006.01)
*H04R 1/10* (2006.01)

(52) U.S. Cl.
CPC ......... *H04R 25/405* (2013.01); *H04R 1/1016* (2013.01); *H04R 25/604* (2013.01); *H04R 2430/23* (2013.01)

(58) Field of Classification Search
CPC .. H04R 25/505; H04R 25/407; H04R 25/604; H04R 25/554; H04R 25/609; H04R 25/652; H04R 1/1016; H04R 1/406; H04R 3/005; H04R 25/00; H04R 25/40; H04R 25/405; H04R 25/453; H04R 2225/025; H04R 2225/43; H04R 2430/23;
(Continued)

(56) References Cited

U.S. PATENT DOCUMENTS

| | | | | |
|---|---|---|---|---|
| 8,213,634 | B1 * | 7/2012 | Daniel | H04R 3/005 381/91 |
| 9,973,849 | B1 * | 5/2018 | Zhang | H04R 3/005 |
| 10,304,475 | B1 * | 5/2019 | Wang | G01S 3/80 |

(Continued)

FOREIGN PATENT DOCUMENTS

| | | |
|---|---|---|
| EP | 3 328 097 A1 | 5/2018 |
| EP | 3 525 488 A1 | 8/2019 |

*Primary Examiner* — Gerald Gauthier
(74) *Attorney, Agent, or Firm* — Birch, Stewart, Kolasch & Birch, LLP

(57) ABSTRACT

A hearing device adapted to be worn by a user and for picking up sound containing the user's own voice is provided. The hearing device includes an input unit having first and second input transducers for converting sound to first and second electric input signals, respectively, representing the sound. The hearing device is configured to provide that the first and second input transducers are located on the user so that the user experiences first and second, acoustically different, acoustic environments, respectively, when the user wears the hearing device. The first acoustic environment may be defined as an environment where the own voice signal primarily originates from vibrating parts of the bones and skin or tissue. The second acoustic environment may be defined as an environment where the own voice signal primarily originates from the user's mouth or nose and is transmitted through air from said mouth or nose to the second input transducer(s). A method of operating a hearing device is further disclosed.

26 Claims, 20 Drawing Sheets

(58) Field of Classification Search
CPC ... G01S 3/80; G10L 21/0208; G10L 21/0216; G10L 25/78; G10L 2021/02166; H04L 12/1827
See application file for complete search history.

(56) References Cited

U.S. PATENT DOCUMENTS

| | | | | |
|---|---|---|---|---|
| 10,657,981 | B1 * | 5/2020 | Mansour | H04R 3/005 |
| 11,259,127 | B2 * | 2/2022 | De Haan | H04R 25/405 |
| 11,277,685 | B1 * | 3/2022 | Ayrapetian | G10L 21/0208 |
| 11,483,646 | B1 * | 10/2022 | Pan | H04R 3/005 |
| 11,991,499 | B2 * | 5/2024 | Hoang | H04R 25/405 |
| 2008/0270131 | A1 | 10/2008 | Fukuda et al. | |
| 2015/0304782 | A1 * | 10/2015 | Zurbrugg | H04R 25/407 381/328 |
| 2018/0048969 | A1 * | 2/2018 | Jensen | H04R 25/554 |
| 2018/0359572 | A1 * | 12/2018 | Jensen | H04R 25/407 |
| 2019/0028817 | A1 * | 1/2019 | Gabai | H04R 25/407 |
| 2019/0075399 | A1 * | 3/2019 | Nyegaard | H04L 12/1827 |
| 2019/0394576 | A1 * | 12/2019 | Petersen | H04R 25/453 |
| 2020/0107137 | A1 * | 4/2020 | Koutrouli | H04R 25/405 |
| 2021/0067885 | A1 * | 3/2021 | Pedersen | H04R 25/405 |
| 2021/0297789 | A1 * | 9/2021 | De Haan | H04R 1/1016 |
| 2022/0141598 | A1 * | 5/2022 | De Haan | H04R 1/1016 381/313 |
| 2023/0308814 | A1 * | 9/2023 | Pedersen | H04R 3/005 |

* cited by examiner

HEARING DEVICE ADAPTED TO PROVIDE AN ESTIMATE OF A USER'S OWN VOICE

CROSS-REFERENCE TO RELATED APPLICATION

This application is a Divisional of U.S. application Ser. No. 16/826,017, filed on Mar. 20, 2020, the entire contents of which are hereby incorporated by reference into the present application.

SUMMARY

The disclosure relates to hearing devices, e.g. headsets or headphones or hearing aids or ear protection devices or combinations thereof, in particular to the pick up of a user's own voice. In the present context, a 'target signal' is generally (unless otherwise stated) the user's own voice.

The hearing device comprises at least two (first and second) input transducers (e.g. microphones and/or vibration sensors) located at or in or near an ear of the user. The at least two, e.g. first and/or second, input transducers may be located at or in an ear canal of the user. The locations of the first and second input transducers in the hearing device when mounted on the user may be selected to provide different acoustic characteristics of the first and second electric input signals.

An estimate of the user's own voice may be provided as a liner combination of electric input signals from the at least two input transducers, e.g. a) in the time domain by linear filtering and subsequent summation of filtered first and second electric input signals, orb) in the (e.g. DFT-) filter bank domain to apply complex (beamformer) weights to each of the first and second electric input signals and subsequent summation of the thus weighted first and second electric input signals. The linear filters (e.g. FIR-filters) as well as the complex (beamformer) weights may be estimated based on an optimization procedure, e.g. comprising a Minimum Variance Distortionless Response (MVDR) procedure.

A Hearing Device:

In a first aspect, a hearing device is provided by the present application.

A hearing device adapted to be worn by a user and for picking up sound containing the user's own voice is provided. The hearing device comprises an input unit comprising first and second input transducers for converting sound to first and second electric input signals, respectively, representing said sound. The hearing device further comprises a processor configured to receive said first and second electric input signals and to provide a combined signal as a linear combination of the first and second electric input signals, wherein the combined signal comprises an estimate of the user's own voice. The hearing device is configured to provide that said first and second input transducers are located on said user at first and second locations, when worn by said user; wherein said first and second locations are selected (arranged) to provide that said first and second electric signals exhibit substantially different directional responses for sound from the user's mouth, as well as from sound from sound sources located in an environment around the user.

Thereby an improved quality of an own voice estimate may be provided.

The term 'substantially different directional responses' may e.g. be exemplified by a free-field response of an input transducer, e.g. a microphone, from a given sound source and a response of an input transducer in a situation where an acoustic propagation path of sound from the sound source to a given input transducer is occluded by one or more objects between said sound source and said input transducer. The 'substantially different directional responses' may be present in at least one frequency range of the first and second electric input signals, in a multitude of frequency ranges or in all frequency ranges of operation of the hearing device.

Substantially different directionally responses can e.g. be observed for far field sources by measuring the directional response of each of the first and second transducers and drawing the polar plot of each microphone. This is a standard measuring method.

The first and second locations may be selected (arranged) to provide that the first and second electric signals exhibit substantially different directional responses for air-borne sound from the environment. The sound sources located in an environment around the user may be located relative to the user to provide that the user is located in an acoustic far-field relative to sound from such sound sources, e.g. more than 1 m from the user.

The hearing device may comprise a processor connected to the input unit. The processor may comprise one or more beamformers, each providing a spatially filtered signal by filtering and summing the first and second (or more) electric input signals, wherein one of the beamformers is an own voice beamformer and wherein the spatially filtered signal comprises an estimate of the user's own voice.

The hearing device may comprise an in the ear (ITE-) part (e.g. an earpiece) that provides an open fitting between the first and second locations. The ITE-part may be configured to allow air and sound to propagate between the first and second locations. The ITE-part may comprise a guiding element comprising one or more openings that allows air and sound to pass.

In a second aspect, a hearing device is provided by the present application.

A hearing device adapted to be worn by a user and for picking up sound containing the user's own voice is furthermore. The hearing device comprises

- an input unit comprising first and second input transducers for converting sound to first and second electric input signals, respectively, representing said sound;
- a processor configured to receive said first and second electric input signals and to provide a combined signal as a linear combination of the first and second electric input signals, wherein the combined signal comprises an estimate of the user's own voice, and
- wherein said hearing device is configured to provide that said least first and second input transducers are located on said user at first and second locations, when worn by said user; and
- wherein said first and second locations are defined by properties of the respective first and second electric input signals being different in that they exhibit a difference in signal to noise ratio of an own voice signal $\Delta SNR_{OV}=SNR_{OV,1}-SNR_{OV,2}$ larger than an SNR-threshold $TH_{SNR}$, where $SNR_{OV,1}>SNR_{OV,2}$, and
- where noise is taken to be all other environmental acoustic signals than that originating from the user's own voice.

The term 'all other environmental acoustic signals than that originating from the user's own voice' is intended not to include 'body noises, e.g. chewing, etc.

The different SNR-environments can be verified by a standard measurement. For each input transducer (e.g. microphone) the frequency response for own voice as well as a far field diffuse noise are measured. The difference between these two measurements will provide the relative SNR, and the difference between the relative SNRs of the two input transducers (e.g. microphones) will provide the $\Delta SNR_{OV}$.

The SNR-threshold $TH_{SNR}$, may be larger than or equal to 5-10 dB, such as larger than or equal to 20-30 dB (e.g. in a low frequency region, below a threshold frequency). The SNR-threshold $TH_{SNR}$ may be frequency dependent, e.g. larger at relatively low frequencies than at relatively high frequencies. The SNR threshold criterion may be fulfilled at least in some frequency bands, e.g. below a threshold frequency, e.g. below 4 kHz, such as below 3 kHz. The SNR threshold criterion may e.g. be fulfilled with $\Delta SNR_{OV}$ of 13-25 dB in low end (which is dominated by OV), and with $\Delta SNR_{OV}$ of 20-30 dB in a mid-frequency range (dominated by passive damping), where a threshold frequency between low and mid frequency range may be around 1 kHz.

The first and second locations may (further) be defined by properties of the respective first and second electric input signals being different in that they exhibit a difference in noise levels $\Delta L_N = L_{N,2} - L_{N,1}$ larger than a noise threshold $TH_N$, where $L_{N,2} > L_{N,1}$.

The first and second locations may be defined by properties of the respective first and second electric input signals being further different in that they exhibit a difference in spectral shaping $\Delta S(f)$, e.g. distortion, of a sound source signal S, e.g. an own voice signal, $\Delta S(f) = \Delta S(f)_1 - \Delta S(f)_2$ being larger than a spectral shaping threshold $TH_{\Delta S}$, where f is frequency. The individual spectral shaping measures $\Delta S(f)_i$, i=1, 2, may e.g. be determined as a sum over frequency, e.g. at a predefined number of frequencies, of a difference between the original sound source signal and the signal provided at the input transducer in question. The difference in spectral shaping $\Delta S(f)$ may e.g. be determined as a difference between the two measures $\Delta S(f)_i$, i=1, 2, i.e. $\Delta S(f) = \Delta S(f)_1 - \Delta S(f)_2$.

The hearing device may comprise a processor connected to said input unit. The processor may comprise one or more beamformers each providing a spatially filtered signal by filtering and summing said first and second (or more) electric input signals. One of the beamformers may be an own voice beamformer and wherein said spatially filtered signal comprises an estimate of the user's own voice.

The hearing device may comprise an in the ear (ITE-)part that fully or partially (acoustically) blocks (occludes) the ear canal between the first and second locations. The ITE-part may comprise a seal that is configured to fit in the ear canal of the user to at least partially (acoustically) seal the first location from the second location. The difference in SNR and/or level and/or spectral characteristics may be enhanced by a partial or full sealing between the first and second locations (acoustic environments). In particular at low frequencies, e.g. below 4 kHz or below 2.5 kHz.

In a third aspect, a hearing device is provided by the present application.

A hearing device adapted to be worn by a user and for picking up sound containing the user's own voice is provided. The hearing device comprises an input unit comprising first and second input transducers for converting sound to first and second electric input signals, respectively, representing said sound;

a processor connected to said input unit, the processor comprising one or more beamformers each providing a spatially filtered signal by filtering and summing said first and second electric input signals, wherein one of said beamformers is an own voice beamformer and wherein said spatially filtered signal comprises an estimate of the user's own voice;

wherein said first input transducer is a vibration sensor and said second input transducer is a microphone.

In the present context, the term 'microphone' (unless specifically stated) is intended to mean an acoustic to electric transducer that converts air-borne vibrations to an electric signal. In other words, 'microphone' is not intended to cover underwater microphones ('hydrophones') of acoustic transducers for picking up surface acoustic waves of vibrations in solid matter (e.g. bone conduction).

The vibration sensor may comprise or be constituted by one or more of a bone conduction microphone, an accelerometer, a strain gage vibration sensor.

The hearing device may be configured to provide that the first input transducer is located in an ear canal of the user (when the hearing device is worn by the user).

The hearing device may be configured to provide that the first input transducer is located at a mastoid part of the temporal bone of the user (when the hearing device is worn by the user). The first input transducer may be located at an ear of the user, e.g. in a mastoid part of the temporal bone.

The hearing device may be configured to provide that the second input transducer is located at or in an ear canal of the user (when the hearing device is worn by the user).

The hearing device may be configured to provide that the second input transducer is located between an ear canal and the mouth of the user (when the hearing device is worn by the user).

The hearing device may comprise more than two input transducers, e.g. three or more. The more than two input transducers may comprise one or more of a microphone and/or a vibration sensor. Any of the more than two input transducers may be located at or in the ear canal, or between an ear canal and the mouth of the user, or on a bony part at the ear of the user, e.g. in a mastoid part of the temporal bone.

The hearing device may comprise a processor connected to the input unit. The processor may comprise one or more beamformers each providing a spatially filtered signal by filtering and summing first and second (or more) electric input signals. One of the beamformers may be an own voice beamformer wherein the spatially filtered signal comprises an estimate of the user's own voice.

In a fourth aspect, a hearing device is provided by the present application.

The hearing device is adapted to be worn by a user and for picking up sound containing the user's own voice. The hearing device comprises an input unit comprising first and second input transducers for converting sound to first and second electric input signals, respectively, representing said sound;

wherein said hearing device is configured to provide that said first and second input transducers are located on said user so that they experience first and second—acoustically different—acoustic environments, respectively, when the user wears the hearing device. The first acoustic environment may be defined as an environment where the own voice signal (primarily) originates from vibrating parts of the bones (skull) and skin/tissue (flesh). The second acoustic environment may be defined as an environment where the own voice signal (primarily) originates from the users mouth and nose and is transmitted through air from mouth/nose to the second input transducer(s) (e.g. microphones).

If the first input transducer is not in (direct or indirect) contact with vibrating matter, a possible "air channel" (e.g.

the airborne part of the transmission channel) from the vibrating matter (e.g. bone/tissue) to the first input transducer may e.g. be between 0 and 10 mm.

The term 'primarily originates from' may in the present context be taken to mean 'to more than 50%', e.g. 'to more than 70%', such as 'to more than 90% originates from'.

The hearing device may comprise an in the ear (ITE-)part that fully or partially (acoustically) blocks (occludes) the ear canal between the first and second acoustic environments.

The term 'acoustically different from each other' may in the present context be taken to mean, that the first and second acoustic environments are separated by one or more objects that prohibit or diminish exchange of acoustic energy between them.

The term 'acoustically different from each other' may in the present context be taken to mean, e.g. 'at least partially isolated from each other', e.g. in that the two acoustic environments are separated by an object, e.g. comprising a seal, for attenuating acoustic transmission between the first and second acoustic environments.

The term 'acoustically different from each other' may in the present context be taken to mean that a 'Transition region' between the first and second acoustic environments (cf. e.g. FIG. 1A-1E) implemented by a minimum distance in the ear canal (e.g. ≥5 mm or ≥10 mm or ≥20 mm, e.g. in the region between 5 mm and 20 mm) between the first and second input transducers, to thereby change the acoustic conditions of an acoustic signal impinging on an input transducer located on each side of the transition region (e.g. its directional properties, and/or its spectral properties, and/or its SNR). The transition region may e.g. be implemented by an object which fully or partially occludes the ear canal, e.g. an ITE-part (e.g. an earpiece). The object may e.g. comprise a sealing element (cf. e.g. FIG. 2A, 2B).

The hearing device may comprise a processor connected to the input unit.

The processor may be configured to receive the first and second electric input signals and to provide a combined signal as a linear combination of the first and second electric input signals, wherein the combined signal comprises an estimate of the user's own voice.

The processor may comprise one or more beamformers each providing a spatially filtered signal by filtering and summing the first and second (or more) electric input signals. One of the beamformers may be an own voice beamformer and wherein the spatially filtered signal comprises an estimate of the user's own voice.

The hearing device may be configured to provide a transitional region between the first and second acoustic environments. The hearing device may comprise an object which fully or partially occludes the ear canal (e.g. an ITE-part (e.g. an earpiece) when the hearing device is worn by the user. The object may e.g. comprise a sealing element. The sealing element may be partially open (i.e. e.g. comprise one or more openings allowing a certain exchange of air and sound with the environment to decrease a sense of occlusion by the user).

In a fifth aspect, a hearing device is provided by the present application.

A hearing device adapted to be worn by a user and for picking up sound containing the user's own voice is provided. The hearing device may comprise an input unit comprising first and second input transducers for converting sound to first and second electric input signals, respectively, representing said sound;

a processor connected to said input unit, the processor comprising one or more beamformers each providing a spatially filtered signal by filtering said first and second electric input signals and summing the first and second filtered signals, wherein one of said beamformers is an own voice beamformer and wherein said spatially filtered signal comprises an estimate of the user's own voice;

an earpiece comprising a housing adapted for being located at or in an ear canal of the user, and at least partially occluding said ear canal to create residual volume between said housing of the earpiece and an ear drum of the ear canal;

wherein said first input transducer is located in or on said housing of the earpiece facing the ear drum, when the user wears the hearing device; and wherein said second input transducer is located in the hearing device facing an environment of the user, when the user wears the hearing device.

The hearing device may comprise a processor connected to said input unit. The processor may comprise one or more beamformers each providing a spatially filtered signal by filtering and summing said first and second (or more) electric input signals. One of the beamformers may be an own voice beamformer and wherein said spatially filtered signal comprises an estimate of the user's own voice.

The hearing device may be configured to provide that the second input transducer is capable of picking up predominantly airborne sound. The airborne sound may include sound from the environment, including from the user's mouth.

In a sixth aspect of the present application, A hearing device adapted to be worn by a user and for picking up sound containing the user's own voice, the hearing device comprising an input unit comprising first and second input transducers for converting sound to first and second electric input signals, respectively, representing said sound;

a processor connected to said input unit, the processor comprising one or more beamformers each providing a spatially filtered signal by filtering and summing said first and second electric input signals, wherein one of said beamformers is an own voice beamformer and wherein said spatially filtered signal comprises an estimate of the user's own voice is provided. The hearing device may be adapted to provide that, wherein said hearing device is configured to provide that said first and second input transducers are located on said user at first and second locations, when worn by said user; and wherein said first and second locations are selected (arranged) to provide that said first and second electric signals exhibit substantially different spectral responses for sound from the user's mouth.

The spectral distortion of the second electric input signal may be smaller than the spectral distortion of the first electric input signal, at least in a frequency range comprising the user's own voice. The difference in spectral responses between the first electric input signal and the second electric signal may e.g. be measured as a difference between the first and second electric input signal at one or more frequencies, e.g. at one or more frequencies which are relevant for speech, e.g. at 1 kHz and/or 2 kHz, or at (one or more of, such as all, of) 100 Hz, 500 Hz, 1 kHz, 2 kHz, and 4 kHz, etc. (possibly averaged over time, e.g. 1 s or more). If the difference between the first and second electric input signals at one or more, e.g. at least two, frequencies (which are relevant for speech) are larger than a threshold difference, the first and second electric signals are taken to exhibit substantially different spectral responses for sound from the user's mouth, i.e. e.g. if the difference between $\Delta_{ov}(k_1)$ $=MAG(IN1_{ov}(k_1))-MAG(IN2_{ov}(k_1))$ and $\Delta_{ov}(k_2)=MAG(IN1_{ov}(k_2))-MAG(IN2_{ov}(k_2))$ is larger than a threshold value, e.g. larger than 3 dB, such as larger than 6 dB, where $k_1$ and $k_2$ are different frequencies spanning a frequency range, e.g. between 100 Hz and 2.5 kHz, or between 1 kHz and 2 kHz, and $IN1_{ov}$, $IN2_{ov}$ are the first and second electric input signals, when the user speaks, and MAG is magnitude.

The first location may be selected to exploit conduction of sound from the user's mouth through the head (skull) of the user. Conduction of sound from the user's mouth through the head of the user may e.g. be constituted by or comprise bone conduction (e.g. in combination with skin and/or tissue (flesh). The first input transducer may comprise or be constituted by a vibration sensor, e.g. an accelerometer.

The second location may be selected to exploit air conduction of sound from the user's mouth. Conduction of sound from the user's mouth to the second location be constituted by or comprise propagation through air. The second input transducer may comprise or be constituted by a microphone.

In the present context a 'microphone' is taken to mean an input transducer that is specifically configured to convert vibration of sound in air to an electric signal representative thereof.

The hearing device may comprise an in the ear (ITE-)part that fully or partially (acoustically) blocks (occludes) the ear canal between the first and second locations.

In a seventh aspect, a hearing device is provided by the present application.

A hearing device configured to be located at or in an ear of a user, and to pick up sound containing the user's own voice may furthermore be provided. The hearing device may comprise:

- an input unit comprising at least a first and a second input transducer for providing respective electric input signals representing sound picked up in a vicinity of said user wherein
- said first input transducer is located within the ear canal and arranged at an inward facing end of said hearing device (when operationally mounted at least partially within an ear canal of the user;
- said second input transducer is located in the free field or at an outward facing end of the hearing device when operationally mounted at least partially within the ear canal of said user; and
- a processor connected to said input unit, the processor comprising one or more beamformers each providing a spatially filtered signal by filtering and summing said first and second electric input signals, wherein one of said beamformers is an own voice beamformer and wherein said spatially filtered signal comprises an estimate of the user's own voice.
- an application for receiving said estimate of the user's own voice or a processed version thereof.

The application may comprise a transmitter configured to wirelessly transmit the estimate of the user's own voice to an external device or system.

The application may comprise a voice control interface configured to control functionality of the hearing device based on the estimate of the user's own voice. The application may e.g. comprise a keyword detector, e.g. wake-word detector and/or a command word detector.

It is intended that the following features can be combined with a hearing device according to any of the abovementioned aspects.

The hearing device may be configured to provide that the first input transducer may be located in an ear canal of the user facing the eardrum and the second input transducer may be located at or in the ear canal of the user facing the environment. The first and second input transducers may be located in an ITE-part adapted for being located fully or partially in the ear canal of the user.

The hearing device according may comprise an output unit comprising an output transducer, e.g. a loudspeaker or a vibrator, for converting an electric signal representing sound to an acoustic signal representing said sound.

The hearing device may be configured to provide that the output transducer plays into the (or a) first acoustic environment.

The hearing device may be configured to provide that the output transducer is located in the hearing device between the first and second input transducers.

The hearing device may comprise a housing adapted to be located at or in an ear (e.g. at or in an ear canal) of the user, whereon or wherein said first input transducer and/or said output transducer is/are supported or located.

The hearing device may comprise an earpiece wherein said earpiece (e.g. a housing of the earpiece) is configured to contribute to an at least partial sealing between (the) first and second acoustic environments and/or (the) first and second locations.

The hearing device (e.g. the housing or the earpiece) may comprise a sealing element configured to contribute to the at least partial sealing between (the) first and second acoustic environments and/or (the) first and second locations.

The hearing device may comprise a transmitter, e.g. a wireless transmitter, configured to transmit the estimate of the user's own voice or a processed version thereof to another device or system, e.g. to a telephone or a computer.

The hearing device may comprise a keyword detector or an own voice detector configured to receive the estimate of the user's own voice or a processed version thereof. This may be used to detect a keyword (e.g. a wake-word) for a voice-controlled application to ensure that a particular spoken keyword originates from the wearer of the hearing device.

The hearing device may comprise a processor for processing the first and second electric input signals and providing a processed signal. The processor may be configured to apply one or more processing algorithms to processing the first and second electric input signals, or signals derived therefrom, e.g. an own voice signal or a beamformed signal representing sound from the environment, e.g. voice (e.g. from a speaker, e.g. a communication partner).

An estimate of the user's own voice may be provided as a liner combination of electric input signals from the at least two input transducers, e.g. a) in the time domain by linear filtering and subsequent summation of filtered first and second electric input signals, orb) in the (e.g. DFT-) filter bank domain to apply complex (beamformer) weights to each of the first and second electric input signals and subsequent summation of the thus weighted first and second electric input signals. The linear filters (e.g. FIR-filters) as well as the complex (beamformer) weights may be estimated based on an optimization procedure, e.g. comprising a Minimum Variance Distortionless Response (MVDR) procedure.

The processor may comprise a beamformer block configured to provide one or more beamformers each being configured to filter the first and second electric input signals, and to provide a spatially filtered (beamformed) signal. The one or more beamformers may comprise an own voice beamformer comprising predetermined or adaptively updated own voice filter weights, wherein an estimate of the user's own voice is provided in dependence on said own voice filter weights and said first and second electric input signals.

The processor may be configured to receive the first and second electric input signals and to provide a combined signal as a linear combination of the first and second electric input signals, wherein the combined signal comprises an estimate of the user's own voice.

The hearing device may comprise one or more further input transducers for providing one or more further electric signals representing sound in the environment of the user. The hearing device may comprise at least one of said one or more further input transducers is located off-line compared to said first and second input transducers.

The first and second input transducer may comprise at least one microphone. The first and second input transducer may comprise at least one vibration sensor, e.g. an accelerometer.

The hearing device may be constituted by or comprise a hearing aid, a headset, an earphone, an ear protection device or a combination thereof.

The hearing device may be constituted by or comprise an air-conduction type hearing aid, a bone-conduction type hearing aid, a cochlear implant type hearing aid, or a combination thereof.

The hearing device or a system comprising a hearing device as described above, in the section 'detailed description of drawings' or in the claims below may comprise first and second earpieces, adapted for being located at or in first and second ears, respectively, of the user.

Each of the first and second earpieces may comprise at least two input transducers, e.g. microphones. Each of the first and second earpieces may each comprise antenna and transceiver circuitry configured to allow an exchange of data, e.g. including audio data, between them.

The input unit may comprise respective analogue to digital converters and/or analysis filter bank as appropriate for the application in question.

An input transducer may be constituted by or comprise a microphone (for sensing airborne sound), or a vibration sensor (e.g. for sensing bone-conducted vibration), e.g. an accelerometer.

The first and second input transducer may comprise at least one microphone. The first and second input transducers may be microphones. The second input transducer may e.g. be constituted by or comprise a microphone. The first input transducer may e.g. be constituted by or comprise a vibration sensor (e.g. an accelerometer). The first and/or second input transducer may e.g. be located outside the ear canal, e.g. in or at Pinna, or behind an ear (Pinna). The first and/or second input transducer may e.g. be located at or in the ear canal. The second input transducer may e.g. be located between an ear canal opening and the user's mouth. The first and second input transducers may e.g. be located in a horizontal plane (when the user is wearing the hearing device and is in an upright position). The first and second input transducers may e.g. be located along a line following an ear canal of the user.

The first and second input transducers may comprise an eardrum-facing input transducer and an environment-facing input transducer. The first input transducer may be located in an ear canal of the user facing the eardrum and the second input transducer may be located at or in the ear canal of the user facing the environment. In the present context, the term 'an input transducer facing the environment' is intended to mean that it mainly receives acoustically transmitted sound from the environment (e.g. in that it has an inlet directed towards the environment (e.g. away from the ear drum, e.g. towards the mouth of the user). Likewise, the term 'an input transducer facing the eardrum' is intended to mean that it mainly receives sound from a (residual) volume close to the eardrum, e.g. in that it has an inlet directed towards the ear drum. Such location will particularly expose the first input transducer to bone conducted sound from the skull of the user (mainly due to the user's own voice). The so-called residual volume may constitute or form part of a first acoustic environment, or to characterize a first location of the first input transducer.

The hearing device may comprise one or more further input transducers for providing one or more electric signals representing sound. The one or more further input transducers may located in the first acoustic environment or at the first location and/or in the second acoustic environment or the second location. The one or more further input transducers may be located at or in the ear canal or in pinna or outside pinna. The one or more further transducers may e.g. be located on a support structure (e.g. a boom arm) extending towards the user's mouth.

At least one of the one or more further input transducers may be located off-line compared to said first and second input transducers. The location of the first and second input transducers in the hearing device define a first (microphone) axis. The first (microphone) axis may be substantially parallel to a first axis combining the first and second ear canals (or eardrums) of the user (or substantially parallel to a longitudinal axis of the ear canal (e.g. from the ear canal opening towards the eardrum). The at least one of the one or more further input transducers may be located in a direction of the first axis. However, the at least one of the one or more further input transducers may be located in a direction from the ear canal opening towards the mouth of the user (and thus (possibly) off-line relative to the first and second input transducers). The location of the second and at least one of the one or more further input transducers in the hearing device may define a second (microphone) axis substantially in a direction towards the mouth of the user.

The hearing device my comprise an output unit comprising an output transducer, e.g. a loudspeaker, for converting an electric signal representing sound to an acoustic signal representing said sound. The output unit may comprise a digital to analogue converter and/or a synthesis filter bank as appropriate for the application in question. The output transducer may comprise a loudspeaker, a vibrator of a bone conduction hearings device and/or a multi electrode array of a cochlear implant type hearing device. The output transducer may be arranged in the hearing device at a first location configured to play into the first acoustic environment. The output transducer may be located in the hearing device between the first and second input transducers.

The hearing device may comprise an ITE part adapted for being fully or partially inserted into an ear canal of the user, e.g. an earpiece. The ITE-part/earpiece may e.g. comprise a housing, adapted to be located at or in an ear of the user, whereon or wherein said first input transducer and/or said output transducer is/are supported or located.

The ITE-part/earpiece may be configured to contribute to an at least partial sealing between the first and second acoustic environments or the first and second locations. The earpiece may be configured to constitute an at least partial sealing between the first and second acoustic environments. The hearing device, e.g. the ITE-part/earpiece, may comprise a sealing element configured to contribute to said at least partial sealing between the first and second acoustic environments.

The hearing device may comprise a receiver, e.g. a wireless receiver, for receiving a signal representative of sound from another device or system. The hearing device may comprise a transmitter, e.g. a wireless transmitter, configured to transmit a signal picked up by said first and second input transducers or a processed version thereof (e.g. the user's own voice) to another device or system. The hearing device may comprise antenna and transceiver circuitry configured to establish a wireless audio link between the hearing device and another device, e.g. a telephone or a computer, The wireless audio link may be based on Bluetooth, e.g. Bluetooth Low Energy, or similar technology.

The hearing device may comprise a processor for processing said first and second electric input signals and providing a processed signal. The processed signal may be adapted to compensate for the user's hearing impairment. The processed signal may be presented to the user via an output transducer.

The processor may comprise a beamformer block configured to provide one or more beamformers each being configured to filter said first and second electric input signals, and to provide a spatially filtered (beamformed) signal. The one or more beamformers may comprise an own voice beamformer comprising predetermined or adaptively updated own voice filter weights, wherein an estimate of the user's own voice is provided in dependence on the own voice filter weights and the first and second (or more) electric input signals. The one or more beamformers comprises an MVDR beamformer (MVDR=minimum variance distortionless response).

A hearing device or a hearing system may comprise first and second earpieces, adapted for being located at or in first and second ears, respectively, of the user. Each of the first and second hearing devices may comprise at least two input transducers, e.g. microphones. The first and second earpieces may comprise antenna and transceiver circuitry configured to allow an exchange of data, e.g. including audio data, between them.

A hearing device may comprise a hearing aid, e.g. a hearing instrument adapted for being located at the ear or fully or partially in the ear canal of a user, a headset, an earphone, an ear protection device or a combination thereof. A hearing device may be constituted by or comprise an air-conduction type hearing aid, a bone-conduction type hearing aid, a cochlear implant type hearing aid, or a combination thereof. The hearing device (or hearing devices of a binaural hearing system) may e.g. comprise or be implemented in connection with a carrier adapted to be worn on the head of the user, e.g. a spectacle frame.

The hearing device, e.g. a hearing aid, may be adapted to provide a frequency dependent gain and/or a level dependent compression and/or a transposition (with or without frequency compression) of one or more frequency ranges to one or more other frequency ranges, e.g. to compensate for a hearing impairment of a user. The hearing device may comprise a signal processor for enhancing the input signals and providing a processed output signal, e.g. being adapted to compensate for a hearing impairment of a user, e.g. the user of the hearing device.

The hearing device, e.g. a hearing aid or a headset, etc., may comprise an output unit for providing a stimulus perceived by the user as an acoustic signal based on a processed electric signal. The output unit may comprise a number of electrodes of a cochlear implant (for a CI type hearing aid) or a vibrator of a bone conducting hearing aid. The output unit may comprise an output transducer. The output transducer may comprise a receiver (loudspeaker) for providing the stimulus as an acoustic signal to the user (e.g. in an acoustic (air conduction based) hearing aid). The output transducer may comprise a vibrator for providing the stimulus as mechanical vibration of a skull bone to the user (e.g. in a bone-attached or bone-anchored hearing aid).

The hearing device comprises an input unit for providing an electric input signal representing sound. The input unit may comprise an input transducer, e.g. a microphone or a vibration sensor, for converting an input sound to an electric input signal.

The hearing device may comprise a directional microphone system adapted to spatially filter sounds from the environment, and thereby e.g. to enhance a target acoustic source among a multitude of acoustic sources in the local environment of the user wearing the hearing device (or suppress signal(s) from one or more a specific directions). The directional system is adapted to detect (such as adaptively detect) from which direction a particular part of the microphone signal originates (e.g. noise or target parts). This can be achieved in various different ways as e.g. described in the prior art. In hearing devices, a microphone array beamformer is often used for spatially attenuating background noise sources and/or (possibly simultaneously) to provide target signal (e.g. from a communication partner or the user him- or herself) with an improved signal quality. Many beamformer variants can be found in literature. The minimum variance distortionless response (MVDR) beamformer is widely used in microphone array signal processing. Ideally the MVDR beamformer keeps the signals from the target direction (also referred to as the look direction) unchanged, while attenuating sound signals from other directions maximally. The generalized sidelobe canceller (GSC) structure is an equivalent representation of the MVDR beamformer offering computational and numerical advantages over a direct implementation in its original form.

The hearing device may comprise a memory. The memory may be configured to store one or more sets of (e.g. pre-determined, or updated during use) beamformer weights, or, correspondingly, filter coefficients of linear filters, e.g. FIR-filters, see e.g. FIG. 5A, 5B. The stored beamformer weights or filter coefficients of linear filters may relate to own voice estimation according to the present disclosure.

The hearing device may comprise antenna and transceiver circuitry (e.g. a wireless receiver) for wirelessly receiving a direct electric input signal from another device, e.g. from an entertainment device (e.g. a TV-set), a communication device, a wireless microphone, or another hearing device, e.g. a bearing aid. The direct electric input signal may represent or comprise an audio signal and/or a control signal and/or an information signal.

In general, a wireless link established by antenna and transceiver circuitry of the hearing device can be of any type. The wireless link may be used under power constraints, e.g. in that a head set or a hearing device is constituted by or comprise a portable (typically battery driven) device. The wireless link may be a link based on near-field communication, e.g. an inductive link based on an inductive coupling between antenna coils of transmitter and receiver parts. The wireless link may be based on far-field, electromagnetic radiation. The wireless link may e.g. be configured to transfer an electromagnetic signal in the radio frequency range (3 kHz to 300 GHz). The wireless link may e.g. be configured to transfer an electromagnetic signal in a frequency range of light (e.g. infrared light 300 GHz to 430 THz, or visible light, e.g. 430 THz to 770 THz). The wireless link based on far-field, electromagnetic radiation may e.g. be based on Bluetooth technology (e.g. Bluetooth Low-Energy technology).

The hearing device may have a maximum outer dimension of the order of or less than 0.15 m (e.g. a headset). The hearing device may have a maximum outer dimension of the order of or less than 0.04 m (e.g. a hearing instrument).

The hearing device may be or form part of a portable (i.e. configured to be wearable) device, e.g. a device comprising a local energy source, e.g. a battery, e.g. a rechargeable battery. The hearing device may e.g. be a low weight, easily wearable, device, e.g. having a total weight less than 100 g, e.g. less than 20 g.

The hearing device, e.g. a hearing aid, may comprise a forward or signal path between an input unit (e.g. an input transducer, such as a microphone or a microphone system and/or direct electric input (e.g. a wireless receiver)) and an output unit, e.g. an output transducer. The signal processor may be located in the forward path. The signal processor may be adapted to provide a frequency dependent gain according to a user's particular needs. The hearing device may comprise an analysis path comprising functional components for analyzing the input signal (e.g. determining a level, a modulation, a type of signal, an acoustic feedback estimate, etc.).

Some or all signal processing of the analysis path and/or the signal path may be conducted in the frequency domain. Some or all signal processing of the analysis path and/or the signal path may be conducted in the time domain.

The hearing device may comprise an analogue-to-digital (AD) converter to digitize an analogue input (e.g. from an input transducer, such as a microphone) with a predefined sampling rate, e.g. 20 kHz. The hearing device may comprise a digital-to-analogue (DA) converter to convert a digital signal to an analogue output signal, e.g. for being presented to a user via an output transducer.

The hearing device, e.g. the input unit, and or the antenna and transceiver circuitry comprise(s) a TF-conversion unit for providing a time-frequency representation of an input signal. The time-frequency representation may comprise an array or map of corresponding complex or real values of the signal in question in a particular time and frequency range. The TF conversion unit may comprise a filter bank for filtering a (time varying) input signal and providing a number of (time varying) output signals each comprising a distinct frequency range of the input signal. The TF conversion unit may comprise a Fourier transformation unit for converting a time variant input signal to a (time variant) signal in the (time-)frequency domain. The frequency range considered by the hearing aid from a minimum frequency $f_{min}$ to a maximum frequency $f_{max}$ may comprise a part of the typical human audible frequency range from 20 Hz to 20 kHz, e.g. a part of the range from 20 Hz to 12 kHz. Typically, a sample rate $f_s$ is larger than or equal to twice the maximum frequency $f_{max}$, $f_s \geq 2f_{max}$. A signal of the forward and/or analysis path of the hearing device may be split into a number NI of frequency bands (e.g. of uniform width), where NI is e.g. larger than 5, such as larger than 10, such as larger than 50, such as larger than 100, such as larger than 500, at least some of which are processed individually. The hearing device may be adapted to process a signal of the forward and/or analysis path in a number NP of different frequency channels (NP≤NI). The frequency channels may be uniform or non-uniform in width (e.g. increasing in width with frequency), overlapping or non-overlapping.

The hearing device, e.g. a hearing aid, may be configured to operate in different modes, e.g. a normal mode and one or more specific modes, e.g. selectable by a user, or automatically selectable. A mode of operation may be optimized to a specific acoustic situation or environment. A mode of operation may include a low-power mode, where functionality of the hearing device is reduced (e.g. to save power), e.g. to disable wireless communication, and/or to disable specific features of the hearing device.

The hearing device may comprise a number of detectors configured to provide status signals relating to a current physical environment of the hearing device (e.g. the current acoustic environment), and/or to a current state of the user wearing the hearing device, and/or to a current state or mode of operation of the hearing device. Alternatively. or additionally, one or more detectors may form part of an external device in communication (e.g. wirelessly) with the hearing device. An external device may e.g. comprise another hearing device, a remote control, and audio delivery device, a telephone (e.g. a smartphone), an external sensor, etc.

One or more of the number of detectors may operate on the full band signal (time domain). One or more of the number of detectors may operate on band split signals ((time-) frequency domain), e.g. in a limited number of frequency bands.

The number of detectors may comprise a level detector for estimating a current level of a signal of the forward path. The detector may be configured to decide whether the current level of a signal of the forward path is above or below a given (L-)threshold value. The level detector operates on the full band signal (time domain). The level detector operates on band split signals ((time-) frequency domain).

The hearing device may comprise a voice activity detector (VAD) for estimating whether or not (or with what probability) an input signal comprises a voice signal (at a given point in time). A voice signal is in the present context taken to include a speech signal from a human being. It may also include other forms of utterances generated by the human speech system (e.g. singing). The voice activity detector unit is adapted to classify a current acoustic environment of the user as a VOICE or NO-VOICE environment. This has the advantage that time segments of the electric microphone signal comprising human utterances (e.g. speech) in the user's environment can be identified, and thus separated from time segments only (or mainly) comprising other sound sources (e.g. artificially generated noise). The voice activity detector may be adapted to detect as a VOICE also the user's own voice. Alternatively, the voice activity detector may be adapted to exclude a user's own voice from the detection of a VOICE.

The hearing device may comprise an own voice detector for estimating whether or not (or with what probability) a given input sound (e.g. a voice, e.g. speech) originates from the voice of the user of the system. A microphone system of the hearing device may be adapted to be able to differentiate between a user's own voice and another person's voice and possibly from NON-voice sounds.

The number of detectors may comprise a movement detector, e.g. a vibration sensor, e.g. an acceleration sensor. The movement detector is configured to detect movement of the user's facial muscles and/or bones, e.g. due to speech or chewing (e.g. jaw movement) and to provide a detector signal indicative thereof.

The hearing device may comprise a classification unit configured to classify the current situation based on input signals from (at least some of) the detectors, and possibly other inputs as well. In the present context 'a current situation' is taken to be defined by one or more of a) the physical environment (e.g. including the current electromagnetic environment, e.g. the occurrence of electromagnetic signals (e.g. comprising audio and/or control signals) intended or not intended for reception by the hearing device, or other properties of the current environment than acoustic);

b) the current acoustic environment (input level, feedback, spectral content, modulation, etc.), and c) the current mode or state of the user (movement, temperature, cognitive load, etc.);

d) the current mode or state of the hearing device (program selected, time elapsed since last user interaction, etc.) and/or of another device in communication with the hearing device.

The classification unit may be based on or comprise a neural network, e.g. a trained neural network.

The hearing device may further comprise other relevant functionality for the application in question, e.g. compression, feedback control, noise reduction, etc.

The hearing device may comprise a hearing instrument, e.g. a hearing instrument adapted for being located at the ear or fully or partially in the ear canal of a user. The hearing device may e.g. comprise a headset, an earphone, an ear protection device or a combination thereof. The headset may be adapted to be worn by a user and comprise an input transducer (e.g. microphone) to (e.g. wireless) transmitter path and a (e.g. wireless) receiver to output transducer (e.g. loudspeaker) path. The headset may be adapted to pick up a user's own voice and transmit it via the transmitter to a remote device or system. Likewise, the headset may be adapted to receive a sound signal from a remote device or system and present it to the user via the output transducer.

Use:

In an aspect, use of a hearing device as described above, in the 'detailed description of embodiments' and in the claims, is moreover provided. Use may be provided in a system comprising audio distribution. Use may be provided in a system comprising one or more hearing devices (e.g. hearing instruments), headsets, ear phones, active ear protection systems, etc., e.g. in handsfree telephone systems, teleconferencing systems (e.g. including a speakerphone), public address systems, karaoke systems, classroom amplification systems, etc.

A Method:

In an aspect, a method of operating a hearing device adapted to be worn by a user and for picking up sound containing the user's own voice is furthermore provided by the present application. The method may comprise

- converting sound to first and second electric input signals, respectively, representing said sound using first and second input transducers;
- providing a spatially filtered signal by filtering and summing said first and second electric input signals, and wherein said spatially filtered signal comprises an estimate of the user's own voice,
- providing that said first and second input transducers are located on said user at first and second locations, when worn by said user.

The method may further comprise

- selecting said first and second locations to provide that said first and second electric signals exhibit substantially different directional responses for sound from the user's mouth as well as from sound from sound sources located in an environment around the user.

In a further aspect, a method of operating a hearing device adapted to be worn by a user and for picking up sound containing the user's own voice is provided. The method may comprise

- converting sound to first and second electric input signals, respectively, representing said sound using first and second input transducers;
- providing a spatially filtered signal by filtering and summing said first and second electric input signals, and wherein said spatially filtered signal comprises an estimate of the user's own voice,
- providing that said first and second input transducers are located on said user at first and second locations, when worn by said user; and
- selecting said first and second locations to provide that said first and second electric signals exhibit a difference in signal to noise ratio of an own voice signal $\Delta SNR_{OV}=SNR_{OV,1}-SNR_{OV,2}$ larger than an SNR-threshold $TH_{SNR}$, where $SNR_{OV,1}>SNR_{OV,2}$, where noise is taken to be all other environmental acoustic signals than that originating from the user's own voice.

In a further aspect, a method of operating a hearing device adapted to be worn by a user and for picking up sound containing the user's own voice is provided. The method may comprise

- converting sound to first and second electric input signals, respectively, representing said sound using first and second input transducers;
- providing that said first and second input transducers are located on said user at first and second locations, so that they experience first and second—acoustically different—acoustic environments, respectively, when the user wears the hearing device.

wherein the first acoustic environment is defined as an environment where the own voice signal (primarily) originates from vibrating parts of the bones (skull) and skin/tissue (flesh), and wherein the second acoustic environment is defined as an environment where the own voice signal (primarily) originates from the users mouth and nose and is transmitted through air from mouth/nose to the second input transducer(s).

In a further aspect, a method of operating a hearing device adapted to be worn by a user and for picking up sound containing the user's own voice, the hearing device comprising an ear piece adapted for being located at least partially in an ear canal of the user, is provided. The method may comprise

- converting sound to first and second electric input signals, respectively, representing said sound using first and second input transducers;
- providing a spatially filtered signal by filtering and summing said first and second electric input signals, and wherein said spatially filtered signal comprises an estimate of the user's own voice;
- providing that said first and second input transducers are located on said user at first and second locations, when worn by said user;
- providing that said ear piece at least partially occludes said ear canal to create residual volume between a housing of the earpiece and an ear drum of the ear canal, when worn by said user;
- selecting said first location in or on said housing of the earpiece facing the ear drum, when the user wears the hearing device; and
- selecting said second location in the hearing device facing an environment of the user, when the user wears the hearing device.

In a further aspect, a method of operating a hearing device adapted to be worn by a user and for picking up sound containing the user's own voice is provided. The method may comprise converting sound to first and second electric input signals, respectively, representing said sound using first and second input transducers;

providing a spatially filtered signal by filtering and summing said first and second electric input signals, and wherein said spatially filtered signal comprises an estimate of the user's own voice;

providing that said first and second input transducers are located on said user at first and second locations, when worn by said user; and selecting said first and second locations to provide that said first and second electric signals exhibit substantially different spectral responses for sound from the user's mouth.

In a further aspect, a method of operating a hearing device adapted to be located at or in an ear of a user, and to pick up sound containing the user's own voice may furthermore be provided. The method may comprise:

converting sound to first and second electric input signals, respectively, representing said sound using first and second input transducers;

arranging said first input transducer at an inward facing end of said hearing device when operationally mounted at least partially within an ear canal of the user;

arranging said second input transducer at an outward facing end of the hearing device when operationally mounted at least partially within the ear canal of said user; and providing a spatially filtered signal by filtering and summing said first and second electric input signals, and wherein said spatially filtered signal comprises an estimate of the user's own voice.

receiving said estimate of the user's own voice or a processed version thereof by an application (e.g. for keyword detection or transmission to another device or system).

It is intended that some or all of the structural features of the device described above, in the 'detailed description of embodiments' or in the claims can be combined with embodiments of the method(s), when appropriately substituted by a corresponding process and vice versa. Embodiments of the method(s) have the same advantages as the corresponding devices.

The method may e.g. comprise providing an open fitting between the first and second locations.

The method may e.g. comprise providing that the ear canal between the first and second locations is fully or partially acoustically occluded.

A Hearing System:

In a further aspect, a hearing system comprising a hearing device as described above, in the 'detailed description of embodiments', and in the claims, AND an auxiliary device is moreover provided.

The hearing system is adapted to establish a communication link between the hearing device and the auxiliary device to provide that information (e.g. control and status signals, possibly audio signals) can be exchanged or forwarded from one to the other.

The auxiliary device may comprise a remote control, a smartphone, or other portable or wearable electronic device, such as a smartwatch or the like.

The auxiliary device may be constituted by or comprise a remote control for controlling functionality and operation of the hearing device(s). The function of a remote control is implemented in a smartphone, the smartphone possibly running an APP allowing to control the functionality of the hearing device via the smartphone (the hearing device(s) comprising an appropriate wireless interface to the smartphone, e.g. based on Bluetooth or some other standardized or proprietary scheme).

The auxiliary device may be constituted by or comprise an audio gateway device adapted for receiving a multitude of audio signals (e.g. from an entertainment device, e.g. a TV or a music player, a telephone apparatus, e.g. a mobile telephone or a computer, e.g. a PC) and adapted for selecting and/or combining an appropriate one of the received audio signals (or combination of signals) for transmission to the hearing device.

The auxiliary device may be constituted by or comprise another hearing device. The hearing system may comprise two hearing devices, e.g. hearing aids, adapted to implement a binaural hearing system, e.g. a binaural hearing aid system.

The auxiliary device may comprise a speakerphone (comprising a number of input transducers and a number of output transducers, e.g. for use in an audio conference situation), e.g. comprising a beamformer filtering unit, e.g. providing multiple beamforming capabilities.

BRIEF DESCRIPTION OF DRAWINGS

The aspects of the disclosure may be best understood from the following detailed description taken in conjunction with the accompanying figures. The figures are schematic and simplified for clarity, and they just show details to improve the understanding of the claims, while other details are left out. Throughout, the same reference numerals are used for identical or corresponding parts. The individual features of each aspect may each be combined with any or all features of the other aspects. These and other aspects, features and/or technical effect will be apparent from and elucidated with reference to the illustrations described hereinafter in which:

The figures are schematic and simplified for clarity, and they just show details which are essential to the understanding of the disclosure, while other details are left out. Throughout, the same reference signs are used for identical or corresponding parts.

Figure 1A:
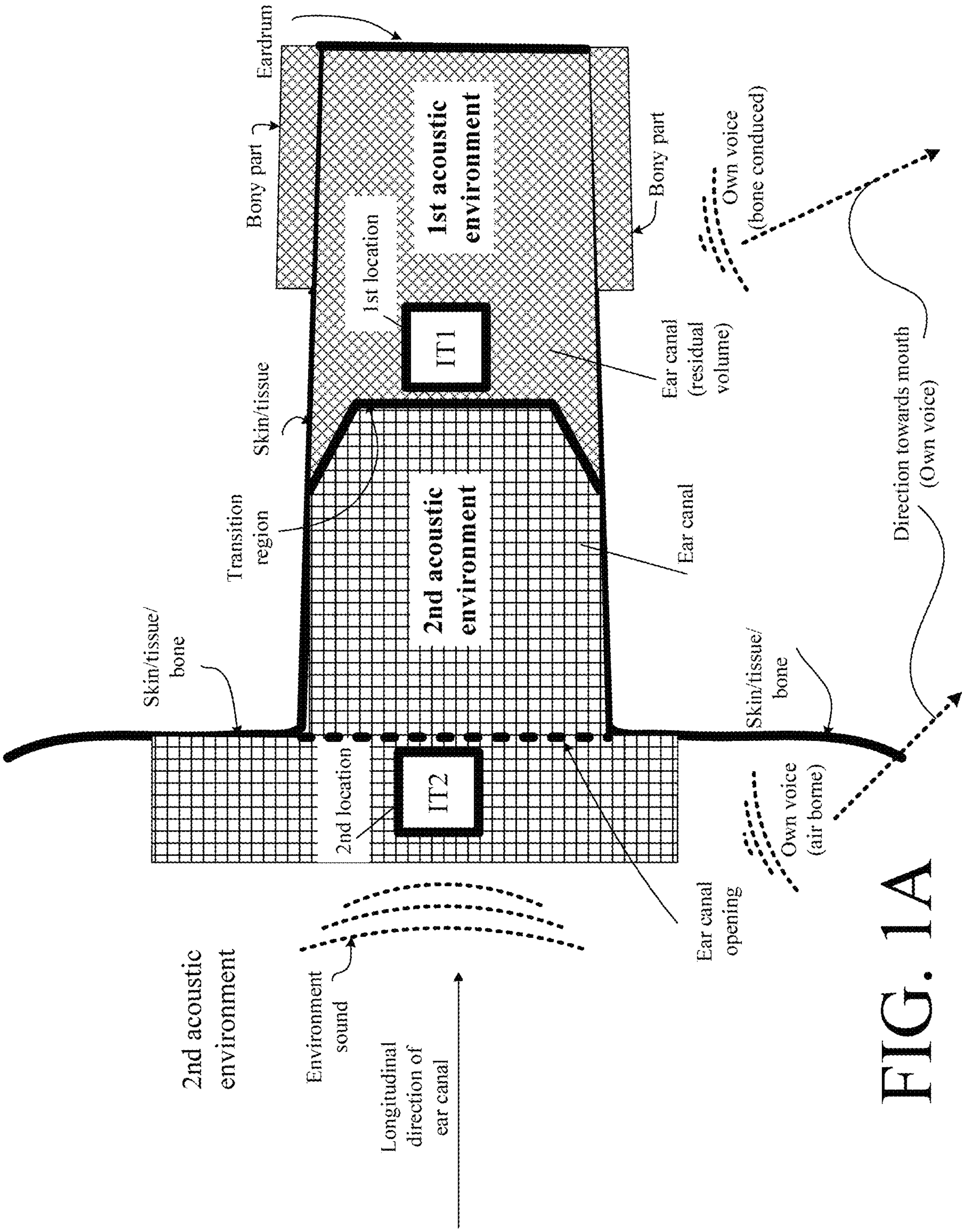
FIG. 1A schematically shows first and second acoustic environments according to an aspect of the present disclosure and first exemplary first and second locations of first and second input transducers of a hearing device according to an embodiment of the present disclosure, FIG. 1B schematically shows second exemplary first and second locations of first and second input transducers of a hearing device according to an embodiment of the present disclosure, FIG. 1C schematically shows third exemplary first and second locations of first and second input transducers of a hearing device according to an embodiment of the present disclosure, FIG. 1D schematically shows fourth exemplary first and second locations of first and second input transducers of a hearing device according to an embodiment of the present disclosure, and FIG. 1E schematically shows fifth exemplary first and second locations of first and second input transducers of a hearing device according to an embodiment of the present disclosure, FIG. 2A schematically shows a first embodiment of an earpiece constituting or forming part of a hearing device according to the present disclosure, e.g. a headset or a hearing aid, configured to be located, at least partially, at or in an ear canal of a user, and FIG. 2B schematically shows a second embodiment of an earpiece constituting or forming part of a hearing device according to the present disclosure, e.g. a headset or a hearing aid, configured to be located, at least partially, at or in an ear canal of a user, FIG. 3 schematically shows an embodiment of a hearing device, e.g. a headset or a hearing aid, according to the present disclosure, the hearing device comprising an earpiece adapted to be worn in an ear canal of a user, FIG. 4A schematically shows a first embodiment of a hearing device according to the present disclosure, the hearing device comprising an earpiece comprising $1^{st}$ and $2^{nd}$ microphones adapted to be located in an ear canal of a user.

Further scope of applicability of the present disclosure will become apparent from the detailed description given hereinafter. However, it should be understood that the detailed description and specific examples, while indicating preferred embodiments of the disclosure, are given by way of illustration only. Other embodiments may become apparent to those skilled in the art from the following detailed description.

DETAILED DESCRIPTION OF EMBODIMENTS

The detailed description set forth below in connection with the appended drawings is intended as a description of various configurations. The detailed description includes specific details for the purpose of providing a thorough understanding of various concepts. However, it will be apparent to those skilled in the art that these concepts may be practiced without these specific details. Several aspects of the apparatus and methods are described by various blocks, functional units, modules, components, circuits, steps, processes, algorithms, etc. (collectively referred to as "elements"). Depending upon particular application, design constraints or other reasons, these elements may be implemented using electronic hardware, computer program, or any combination thereof.

The electronic hardware may include micro-electronic-mechanical systems (MEMS), integrated circuits (e.g. application specific), microprocessors, microcontrollers, digital signal processors (DSPs), field programmable gate arrays (FPGAs), programmable logic devices (PLDs), gated logic, discrete hardware circuits, printed circuit boards (PCB) (e.g. flexible PCBs), and other suitable hardware configured to perform the various functionality described throughout this disclosure, e.g. sensors, e.g. for sensing and/or registering physical properties of the environment, the device, the user, etc. Computer program shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

The disclosure relates to hearing devices, e.g. headsets or headphones or hearing aids ear protection devices or combinations thereof, in particular to the pick up of a user's own voice. In the present context, a 'target signal' is generally (unless otherwise stated) the user's own voice.

In the present application, an own voice capturing system that captures the voice of the user and transfers it to an application (e.g. locally in the hearing device or to in external device or system) is provided. The capturing is achieved by using at least two input transducers, e.g. microphones. The conventional use of the at least two microphones is to use spatial filtering (e.g. beamforming) or source separation (e.g. BSS) on the external sounds from the environment in order to separate unwanted acoustical signals ('noise') from wanted acoustical signals. In a 'normal mode' hearing aid application, target signals are typically arriving from the frontal direction (e.g. to pick up the voice of a communication partner). In a headset application (or in a hearing aid with a telephone mode or a voice interface), target signals are typically arriving from a direction towards the mouth of the user (to pick up the user's own voice).

By placing input transducers (e.g. microphones) of the hearing device in or at the ear canal of the user of the hearing device and e.g. by (partially) sealing the ear canal to the outside offers some interesting opportunities, e.g. for own voice estimation. The input transducers (e.g. microphones) inside the ear canal will pick up own voice signals (OV). The quality of the signal (OV) will depend primarily of the seal of the ear canal. The present application provides a combination of in-ear input transducers (e.g. microphones or vibration sensors) with standard input transducers (e.g. microphones) located outside the (possibly) sealed off part of the ear canal, e.g. completely outside the ear canal (e.g. at or in or behind pinna or further towards the user's mouth). The use of binaural in-ear microphones may also improve signal quality. The two types of locations of the input transducers provide wanted acoustical signals (own voice) that are highly correlated. In the sealed use case, the two types of input transducers (e.g. microphones, or an (external) microphone and an (internal) vibration sensor) also provide noise signals that tend to be uncorrelated.

According to the present disclosure, an estimate of the user's own voice is provided from a linear combination of signals created by input transducers located in different acoustic environments (e.g. relying on bone conduction and air conduction, respectively). The possible symmetry of binaural detection (with regard to the location of the mouth) using input transducers at both ears of the user could greatly aid the quality of own-voice estimation. The environmental noise (unwanted noise) will not exhibit these symmetries. Hence an algorithm may distinguish wanted from unwanted acoustical signals by investigating correlation between the two sources, experienced by input transducers located in two different acoustic environments e.g. located outside and inside an ear canal of the user, e.g. outside and inside a seal of the ear canal. The present disclosure may e.g. rely on standard beamforming procedures, e.g. the MVDR formalism, to determine linear filters or beamformer weights to extract the user's voice from the electric input signals.

The hearing device comprises at least two (first and second) input transducers (e.g. microphones or vibration sensors) located at or in or near an ear of the user. The first and/or second input transducers may be located at or in an ear canal of the user, or elsewhere on the head of the user. The first and second input transducers provide first and second electric input signals, respectively. The following FIG. 1A-1E illustrate a number of exemplary first and second locations of the first and second input transducers, respectively. The first and second locations of the first and second input transducers, when the hearing device is (operationally) located at the ear of the user, are achieved by appropriate adaptation of the hearing device (considering the form and dimensions of the human ear, e.g. specifically adapted to the user's ear). The first and second locations may be selected (and the hearing device specifically adapted) to provide that the first and second input transducers experience first and second different acoustic environments, when the hearing device is mounted on the user. The first and second electric input signals may advantageously be used in combination to provide an estimate of the user's own voice (e.g. based on correlation between, and/or filtering and subsequent summation of the first and second electric input signals).

In the embodiments of FIG. 1A-1E, the transducers from acoustic sound to electric signals representing the sound are denoted as 'input transducers'. The input transducers may e.g. be embodied in microphones or vibration sensors depending on the application, e.g. one being a microphone (e.g. the second input transducer), the other being a vibration sensor (e.g. the first input transducer), or both of the first and second input transducers being microphones. The microphones may e.g. be omni-directional microphones. Directional microphones may, however, be used depending on the application (e.g. the second input transducer may be a directional microphone having a preferred direction towards the user's mouth, when the hearing devices is worn by the user). A vibration sensor may e.g. comprise an accelerometer. It may be beneficial that a vibration sensor is located so that it is in direct or indirect contact with the skin (in the soft or bony part) of the ear canal (or elsewhere on the head of the user).

In the embodiments of FIG. 1A-1E, only two input transducers are shown. This is the minimum number, but it is not intended to (necessarily) limit the number of input transducers to two. Other embodiments may exhibit three or more input transducers. The additional (one or more) input transducers may be located in the first acoustic environment or in the second acoustic environment. However, one or more additional input transducers may be located in both acoustic environments (e.g. one in the first and one in the second acoustic environment, etc.). For example, it may be advantageous (e.g. for a headset application) to include a number of further input transducers (e.g. microphones) in a direction towards the user's mouth, e.g. as a linear array of microphones located on an earpiece or a separate carrier (e.g. to increase the (own voice) SNR experienced by such input transducers). It may be further advantageous to include a number of additional input transducers (e.g. microphones) in the ear canal. Additional microphones in the ear canal may be used to estimate an ear canal geometry and/or to detect possible leaks of sound from the ear canal. Further, an improved calibration of beamformers, e.g. of an own voice beamformer, e.g. to provide personalized linear filters or beamformer weights, can be supported by microphones located in the ear canal.

In the embodiments of FIG. 1A-1E, a 'Transition region' between the first and second acoustic environments is indicated by a solid 'line'. The transition region may e.g. be implemented by creating a minimum distance in the ear canal (e.g. ≥5 mm, or ≥10 mm, or ≥20 mm, e.g. in the region between 5 mm and 25 mm, e.g. between 10 mm and 20 mm), to thereby change the acoustic conditions of an acoustic signal impinging on an input transducer located on each side of the transition region (e.g. its directional properties, and or its spectral properties, and/or its SNR). The transition region may e.g. be implemented by an object which fully or partially occludes the ear canal, e.g. an ITE-part (e.g. an earpiece). The object may e.g. comprise a sealing element. The sealing element may be partially open (i.e. e.g. comprise one or more openings allowing a certain exchange of air and sound with the environment, e.g. to decrease a sense of occlusion by the user).

FIG. 1A schematically shows an ear canal ('Ear canal') of the user wearing a hearing device. The hearing device is not shown in FIG. 1A (see instead FIG. 2A, 2B). For simplicity, the ear canal is shown as straight cylindrical opening in pinna from the environment to the eardrum ('Eardrum'). In reality, the ear canal may have a non-cylindrical extension and exhibiting a varying cross-section (and may have a curved extension between its opening and the eardrum). The walls of the first, relatively soft ('fleshy'), part of the ear canal (closest to the ear canal opening) are denoted 'Skin/tissue' in FIGS. 1A-1E (and 2A, 2B), whereas the walls of the relatively hard part of the ear canal are denoted 'bony part' in FIGS. 1A-1E (and 2A, 2B). The vertical parts of the outer ear (pinna or auricle) denoted 'Skin/tissue/bone' in FIG. 1A-1E define the ear canal opening ('aperture', e.g. visualized by (virtually) connecting opposite parts of the vertical outer walls close to the opening). The bony parts of the outer ear close to the ear canal opening (e.g. close to tragus) may serve as a location for an input transducer (e.g. a vibration sensor) configured to pick up bone-conducted sound).

An ear canal opening may be used as a reference point for the location of the input transducers (e.g. microphones) of the hearing device, e.g. the first input transducer may be located on the internal side of the ear canal opening (and or on a bony part of the head), termed 'a 1$^{st}$ acoustic environment' in FIG. 1A. The 1$^{st}$ acoustic environment (indicated by a cross-hatched filling) may be characterized with its availability of the user's own voice in a bone conducted version (that may be spectrally distorted; e.g. above a threshold frequency, e.g. 2 kHz-3 kHz), cf. indication in FIG. 1A 'Own voice (bone conducted)' next to a dashed arrow denoted 'Direction towards mouth (Own voice)'. The 2$^{nd}$ input transducer may be located on the external side (FIG. 1A) or on the internal side (FIG. 1B) of the ear canal opening, but further towards the environment than the first input transducer. The 2$^{nd}$ acoustic environment (indicated by a quadratically hatched filling) may be characterized with its availability of the user's own voice in an air-borne version (that is spectrally (substantially) undistorted, or at least less spectrally distorted then in the 1$^{st}$ acoustic environment), cf. indication in FIG. 1A 'Own voice (air borne)' next to a dashed arrow denoted 'Direction towards mouth (Own voice)'. The 2$^{nd}$ acoustic environment may be extended to the volume around the ear where an air borne version of the user's own voice can be received with a level above a threshold level (or an SNR above a threshold SNR). In the present context, 'internal side' is taken to mean towards the eardrum, and 'external side' is taken to mean towards the environment, as seen from the ear canal opening (e.g. from a reference point thereon), see e.g. FIG. 1A. The first and second input transducers may both be located in the ear canal (i.e. on the internal side of the ear canal opening), cf. e.g. FIG. 1B, FIG. 4A, 4B, 4C. Such location may benefit from a good sealing between the first and second acoustic environments.

The ear canal opening is in the present context taken to be defined by (e.g. a center point of) a typically oval cross section where the ear canal joins the outer ear (pinna), cf. e.g. FIG. 1A-1E.

Figure 1B:
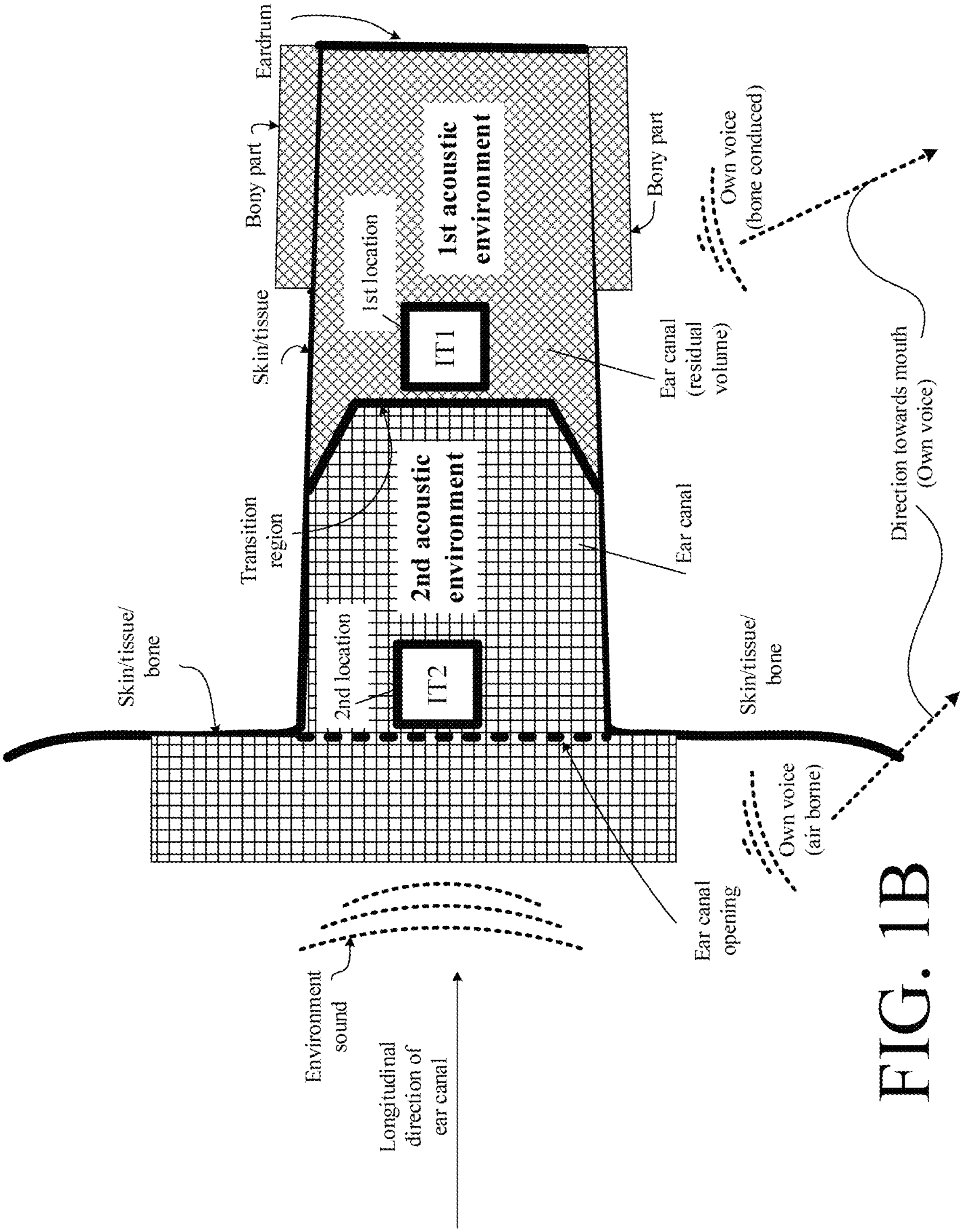

FIG. 1B shows a further exemplary configuration of locations of first and second transducers in or around an ear canal of the user. The configuration of FIG. 1B is similar to the configuration of FIG. 1A apart from the fact that the location of the second transducers is shifted further towards the ear drum, to be located just inside the ear canal opening. Thereby an earpiece located fully in the ear canal (se. e.g. FIG. 3) can be implemented, while still maintaining the advantages of the respective first and second acoustic environments. To provide optimal own voice estimation according to the present disclosure, this location of the second input transducer may benefit from a sealing between the first and second acoustic environments, e.g. using a sealing element around the earpiece housing the make tight fit to the walls of the ear canal, see e.g. FIG. 4B.

Figure 1C:
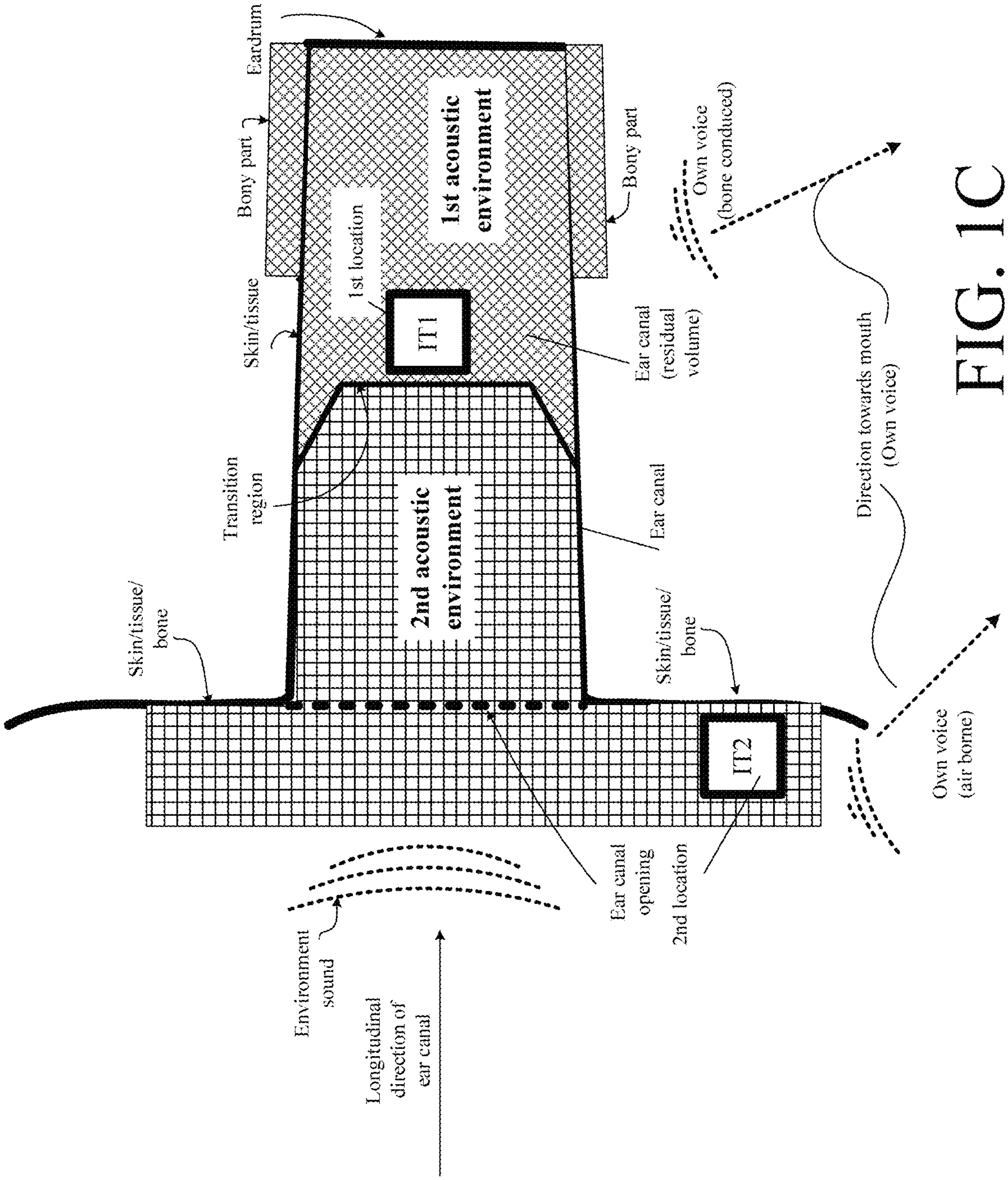

FIG. 1C shows a further exemplary configuration of locations of first and second transducers in or around an ear canal of the user. The configuration of FIG. 1C is similar to the configuration of FIG. 1A apart from the fact that the location of the second transducers is shifted towards the mouth of the user, so that the location ('2$^{nd}$ location)' of the second input transducer is outside the ear canal, in the ear (pinna), e.g. near tragus of antitragus. This has the advantage that the first and second acoustic environments can be fully exploited. The second input transducer (e.g. a microphone) is located closer to the user's mouth and will be exposed to an improved SNR for air-borne reception of the user's own voice. The second input transducer may alternatively be located elsewhere in pinna (e.g. in the upper part of concha, or at the top of pinna, such as e.g. in a BTE-part of a hearing device, such as a hearing aid).

Figure 1D:
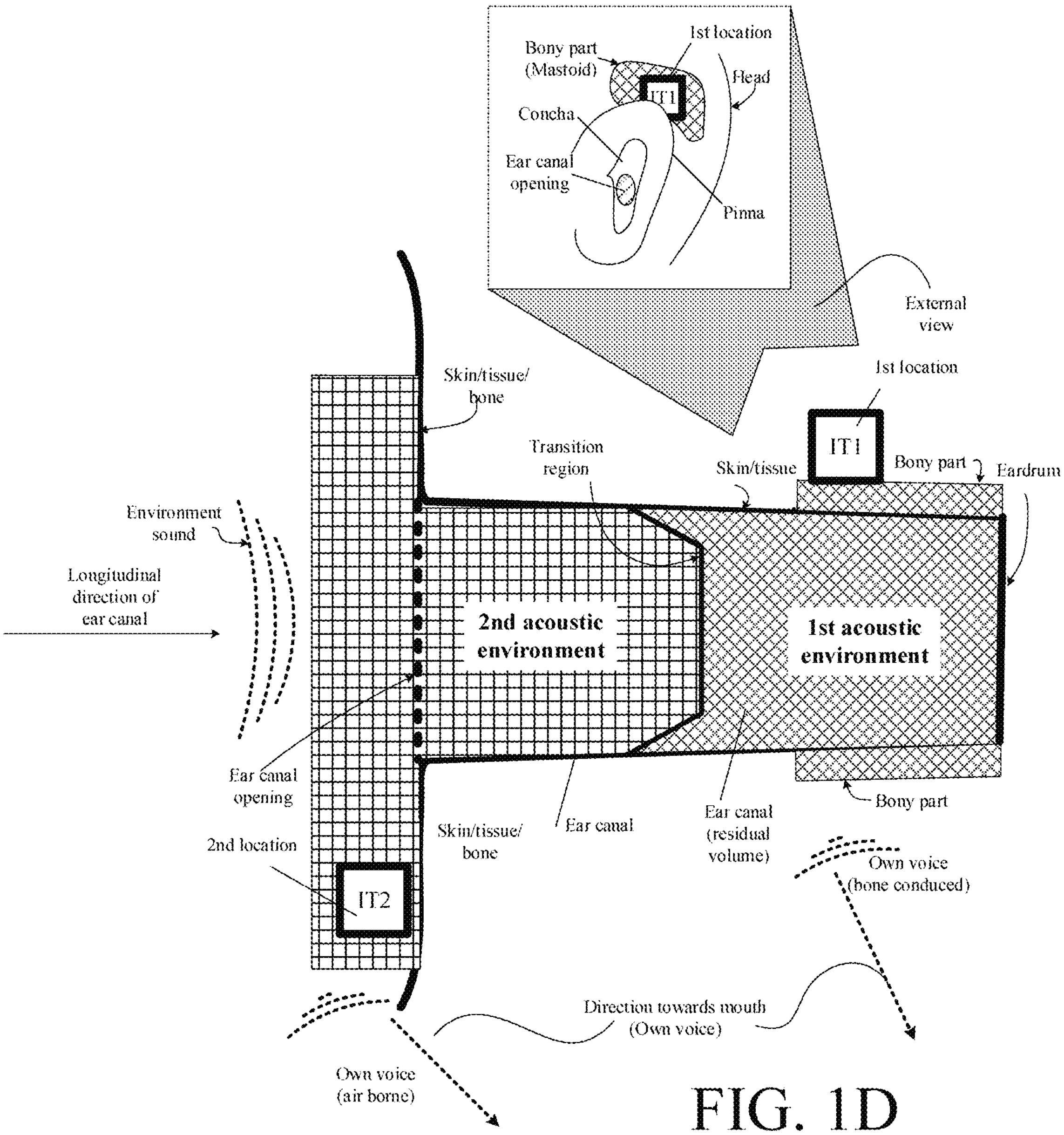

FIG. 1D shows a further exemplary configuration of locations of first and second transducers in or around an ear of the user. The configuration of FIG. 1D is similar to the configuration of FIG. 1C apart from the fact that the location of the first input transducer (IT1) is outside the ear canal, located at or behind pinna (or elsewhere), in contact with bone of the skull, e.g. the mastoid bone. The first input transducer (IT1) may preferably be implemented as a vibration sensor to fully exploit the advantages of bone conduction (e.g. originating from the user's mouth and comprising at least a spectral part of the user's own voice).

Figure 1E:
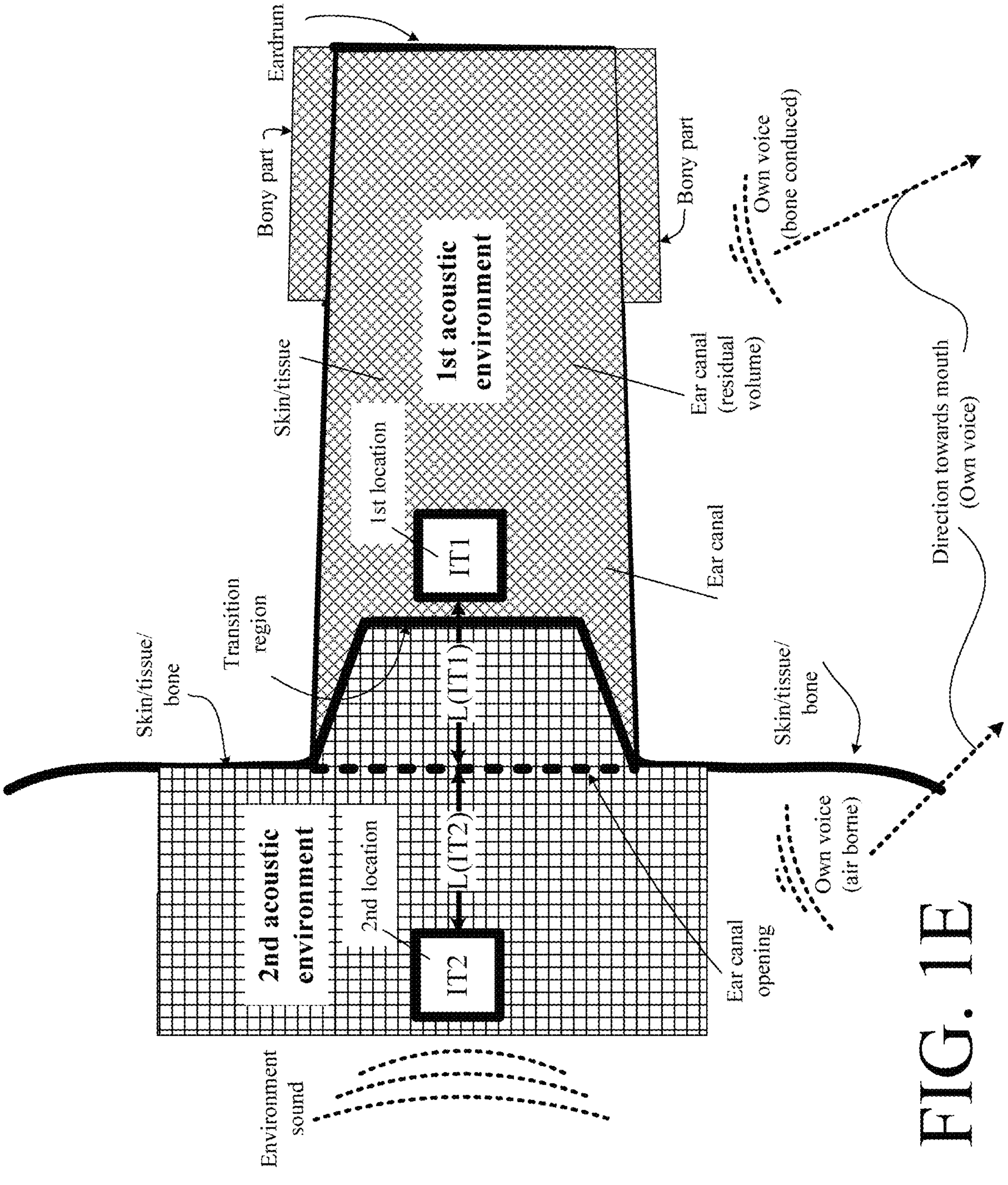

FIG. 1E shows a further exemplary configuration of first and second transducers in first and second acoustic environments around an ear of the user wearing the hearing device. The configuration of FIG. 1E is similar to the configuration of FIG. 1A apart from the fact that both transducers are shifted further towards the environment. The first input transducer (IT1) is located in the ear canal ('1$^{st}$ location' in a '1$^{st}$ acoustic environment') a distance L(IT1) from the ear canal opening. The second input transducer (IT2) is located outside the ear canal ('2$^{nd}$ location', in a '2$^{nd}$ acoustic environment') a distance L(IT2) from the ear canal opening. The distances L(IT1) and L(IT2) may be different. L(IT1) may be larger than L(IT2). The distances L(IT1) and L(IT2) may, however, be essentially equal, each being e.g. in the range between 5 mm and 15 mm, e.g. between 5 mm and 10 mm. This configuration may have the advantage that the second input transducer, e.g. a microphone, is located (just) outside the ear canal to fully provide the benefit of air-borne sound (incl. from the user's mouth), while also getting the benefits of the acoustical properties of the ear (pinna). Further, the location of the first input transducer (e.g. a microphone) just inside the opening of the ear canal has the advantage of avoiding an earpiece that extends deep into the ear canal (a shallow construction), while still having the benefit of a the first acoustic environment (providing an own voice signal with a good SNR).

It is the intention that the configurations of FIG. 1A-1E can be provided with extra input transducers located at other relevant positions inside or outside the ear canal. It is further the intention that the exemplary configurations can be mixed where appropriate (e.g. so that the configuration comprises a vibration senor located at the mastoid bone, as well as a microphone in the $1^{st}$ acoustic environment of the ear canal).

Figure 2A:
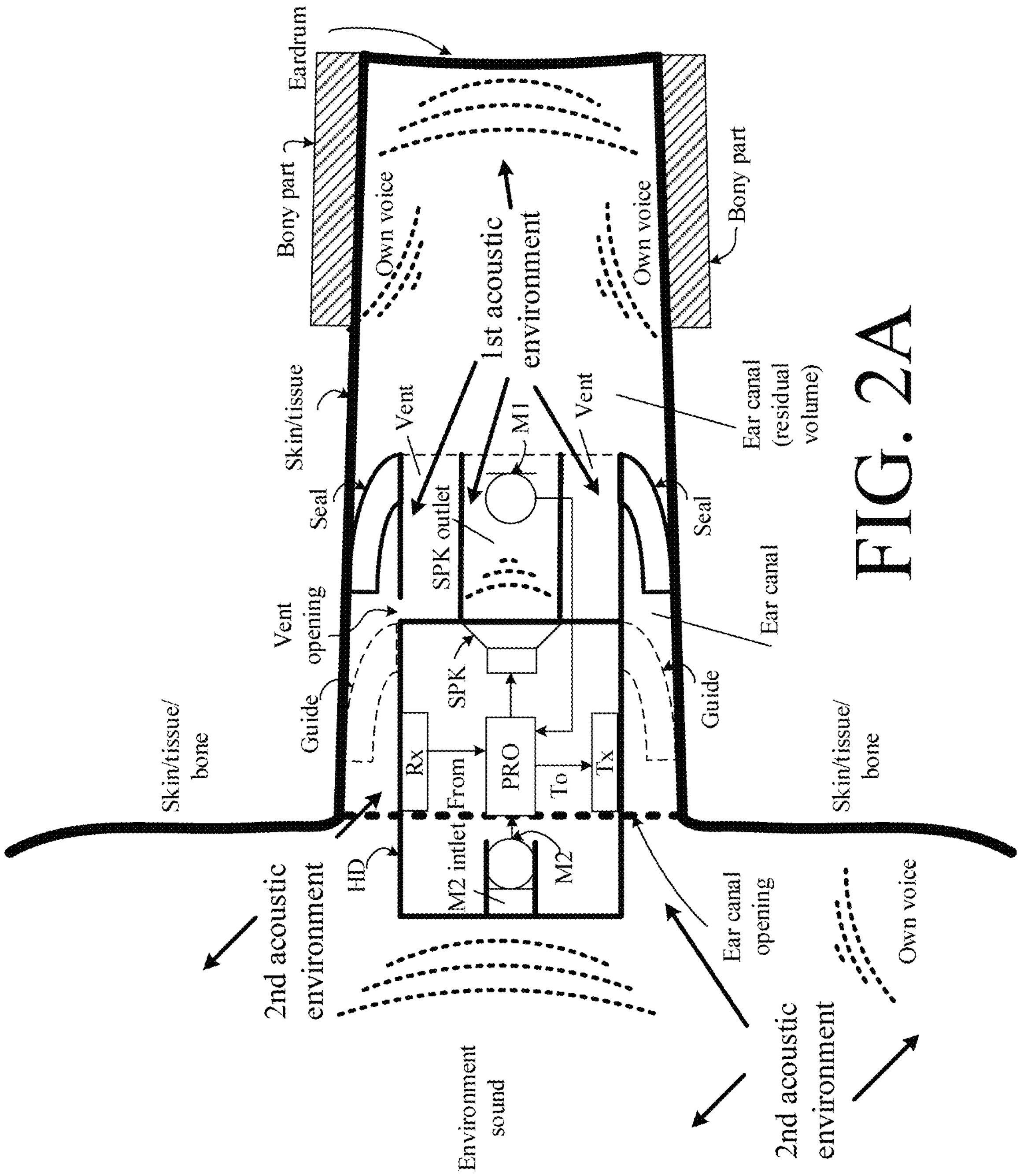
Figure 2B:
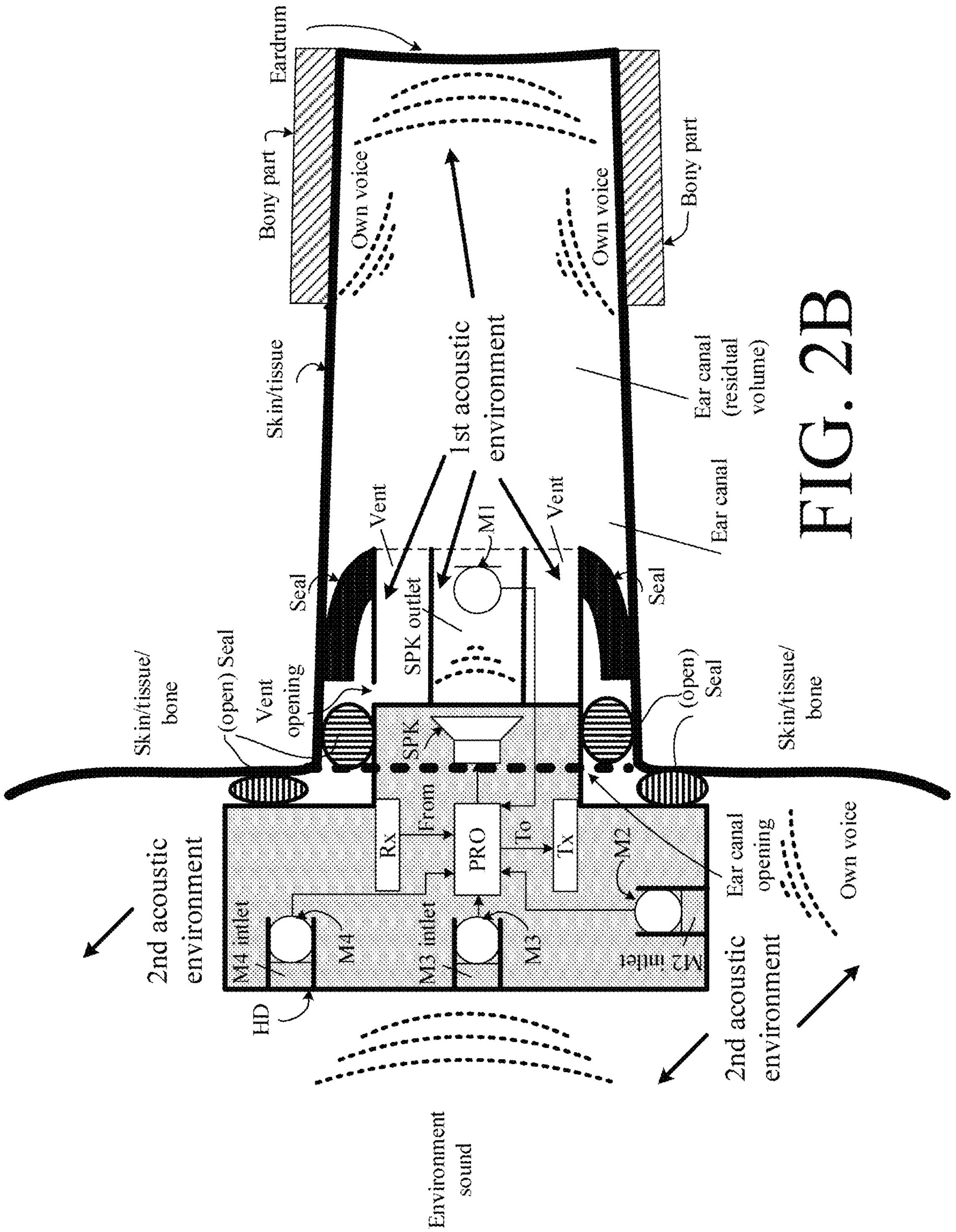

FIGS. 2A and 2B illustrate respective first and second embodiments of an earpiece constituting or forming part of a hearing device according to the present disclosure, e.g. a headset or a hearing aid, configured to be located, at least partially, at or in an ear canal of a user.

The embodiments of a hearing device (HD) illustrated in FIG. 2A and FIG. 2B each comprises first and second microphones (M1, M2), a loudspeaker (SPK), a wireless transceiver (comprising receiver (Rx) and transmitter (Tx)) and a processor (PRO). The processor (PRO) may be connected to the first and second microphones, to the loudspeaker and to the transceiver (Rx, Tx). The processor (PRO) may be configured to (at least in a specific communication mode of operation) generate an estimate of the user's own voice (signal 'To') based on the first and second electric input signals from the first and second microphones (M1, M2), and to feed it to the transmitter (Tx) for transmission to another device or application. The processor may thus e.g. comprise a noise reduction system comprising a beamformer (e.g. an MVDR beamformer) for estimating the user's own voice in dependence of the first and second (and possibly more) electric input signals. The processor (PRO) may further be configured to (at least in a specific communication mode of operation) (possibly process and) feed a signal ('From') received from another device or application via the receiver (Rx) to the loudspeaker (SPK) for presentation to the user of the hearing device.

In the embodiments of FIGS. 2A and 2B, the first microphone (M1) is located in an earpiece or ITE-part (denoted HD in FIG. 2) (constituting or forming part of the hearing device) adapted for reaching at least partially into the ear canal ('Ear canal') of the user. The location of the first microphone in the earpiece may (in principle) be (at least partially) open for sound propagation from or towards the environment. However, in the embodiment of FIGS. 2A and 2B, the location of the first microphone (M1) in the earpiece is (at least partially) closed (e.g. sealed) for sound propagation from or towards the environment (cf. 'Environment sound'). The earpiece (HD) may comprise a sealing element ('Seal') and a guiding element ('Guide', FIG. 2A). The sealing element is intended to make a tight fit (seal) of the housing of the earpiece to the walls of the ear canal. Thereby a volume between the earpiece and the eardrum ('Eardrum'), termed the residual volume ('residual volume') is at least partially sealed from the environment (outside the ear canal ('Ear canal')). This volume is (in the embodiments of FIG. 2A, 2B) termed the '$1^{st}$ acoustic environment' (cf. also FIG. 1A-1E). The part of the ear piece facing the ear drum may comprise a ventilation channel ('Vent') having an opening in the housing of the earpiece ('Vent opening') located in the housing closer to the ear canal opening than the sealing element ('Seal') allowing a limited exchange of air (and sound) between the residual volume and the environment to thereby reduce the (annoying) sensation by the user of occlusion. The seal may be located closer to the eardrum than the seal, if the seal allows some exchange of air and sound with the environment (or if other parts of the construction allows such exchange).

In FIG. 2A, the (optional) guiding element ('Guide'), may be configured to guide the earpiece (e.g. in collaboration with the sealing element) so that it can be inserted into the ear canal in a controlled manner, e.g. so that it is centered along a central axis of the ear canal. The guiding element may be made of a flexible material allowing a certain adaptation to variations in the ear canal cross section. The guiding element may comprise one or more openings allowing air (and sound) to pass it. The guiding element (as well as the seal) may be made of a relatively rigid material.

The loudspeaker (SPK) is located in the earpiece (HD) to play sound towards the eardrum into the residual volume ('Ear canal (residual volume)'). A loudspeaker outlet ('SPK outlet') directs the sound towards the eardrum. Instead of (or in addition to the loudspeaker), the hearing device (HD) may comprise a vibrator for transferring stimuli as vibrations of skull-bone or a multi-electrode array for electric stimulation of the hearing nerve.

In the embodiments of FIGS. 2A and 2B, the first microphone (M1) is located in a loudspeaker outlet ('SPK outlet') and is configured to pick up sound from the $1^{st}$ acoustic environment (including the residual volume), e.g. provided to the residual volume as bone conducted sound, e.g. from the user's mouth (own voice). In the embodiments of FIGS. 2A and 2B, the loudspeaker is located between the first and second microphones.

The first microphone (M1) may be substituted by a vibration sensor e.g. located at the same position as the first microphone, or in direct or indirect contact with the skin in the soft or bony part of the ear canal (the vibration sensor, e.g. comprising an accelerometer, being particularly adapted to pick up bone conducted sound). In another embodiment, the first microphone (M1) may be substituted (or supplemented) by a vibration sensor located outside the ear canal at a location suited to pick up bone conducted sound from the user's mouth, e.g. at an ear of the user in a mastoid part of the temporal bone, or e.g. near the bony part of the ear canal, cf. e.g. FIG. 1D.

In the embodiment of FIG. 2A, the second microphone (M2) is located in the earpiece (HD) near (just outside) the opening of the ear canal ('Ear canal opening'), e.g. so that the directional cues and filtering effects of the outer ear (pinna) are substantially maintained (e.g. more than 50% maintained), and so that the user's own voice is received (mainly) as air conducted sound (and so that its frequency spectrum is substantially undistorted). A location exhibiting the mentioned properties is denoted a 'second acoustic environment' (different from the 'first acoustic environment'). In the embodiment of FIG. 2A, the second microphone is located so that it faces the environment outside the ear canal, e.g. in a microphone inlet ('M2 inlet'). In the embodiment of FIG. 2B, the first and second microphones (M1, M2) (and the loudspeaker (SPK) located therebetween) of FIG. 2A are moved outwards away from the eardrum in a direction towards the environment), as also illustrated and discussed in connection with FIG. 1E. However, in the embodiment of FIG. 2B, the 'second' microphone (M2, aimed at receiving a good quality, air-borne own voice signal is moved to the bottom surface of the outer part of the earpiece (and the location of the second microphone in FIG. 2A is 'occupied' by a 'an additional, third microphone, M3).

The embodiment of a hearing device shown in FIG. 2B comprises the same elements as the embodiment of FIG. 2A. In FIG. 2B, the earpiece has an external part that has a larger cross section than the ear canal (opening). The earpiece is still configured to be partially inserted into the ear canal (but not as deeply as the embodiment of FIG. 2A). The external part comprises partly open sealing elements ('(open) Seal', indicated by 'zebra-stripes') adapted to contact the users skin around (and in) the ear canal opening to make a comfortable and partially open fitting to the user's ear. The part of the earpiece adapted to extend into the ear canal when worn by the user comprises another sealing element ('Seal', indicated by black filling) adapted to make a tight(er) fit (and to guide the ear piece in the ear canal). In addition to the first and second microphones (M1, M2), the earpiece comprises third and fourth microphones (M3, M4) located near the outer surface of the earpiece facing the environment. The third and fourth microphones may be used for picking up sound from the (far-field) acoustic environment of the user (particularly relevant for a hearing aid application). The hearing device, e.g. the processor (PRO) may comprise one or more beamformers each providing a spatially filtered signal by filtering and summing at least two of the first, second, third and fourth electric input signals, wherein one of the beamformers is an own voice beamformer and wherein the spatially filtered signal comprises an estimate of the user's own voice. Another beamformer may be aimed at a target or noise signal in the environment (e.g. in a particular mode of operation), e.g. aimed at cancelling such target or noise signal or at maintaining such target signal (e.g. from a communication partner in the environment). By having microphone inlets, the microphones, although inherently omni-directional, the resulting microphone signal exhibit a degree of directionality. In particular, the second microphone M2 configured to pick up the user's own voice has the advantage of being directed towards the user's mouth.

In an embodiment, the earpiece has only two microphones (M1, M2), e.g. located as outlined in FIG. 1E.

Figure 4A:
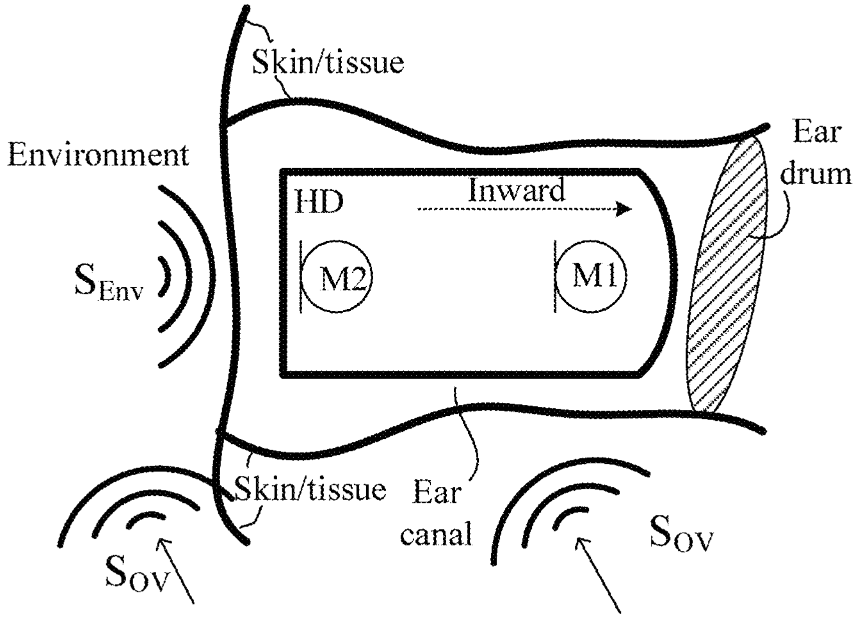
FIG. 4B schematically shows a second embodiment of a hearing device according to the present disclosure, the hearing device comprising an earpiece comprising $1^{st}$ and $2^{nd}$ microphones adapted to be located in an ear canal of a user, the earpiece comprising a guiding or sealing element.
FIG. 4C schematically shows a third embodiment of a hearing device according to the present disclosure, the hearing device comprising an earpiece comprising $1^{st}$ and $2^{nd}$ microphones, the earpiece being adapted to be located in an ear canal of a user, and the hearing device further comprising a (third) microphone located outside the ear canal (e.g. in concha)
FIG. 4D schematically fourth a second embodiment of a hearing device according to the present disclosure, the hearing device comprising an earpiece comprising a $1^{st}$ microphone, the earpiece being adapted to be located in an ear canal of a user, and the hearing device further comprising a $2^{nd}$ microphone located outside the ear canal (e.g. in concha)
FIG. 4E schematically fourth a second embodiment of a hearing device according to the present disclosure, the hearing device comprising an earpiece comprising a $1^{st}$ microphone, the earpiece being adapted to be located in an ear canal of a user, and the hearing device further comprising a $2^{nd}$ microphone located outside the ear canal (e.g. outside concha), e.g. on a boom arm, e.g. extending in a direction of the user's mouth.
Figure 4B:
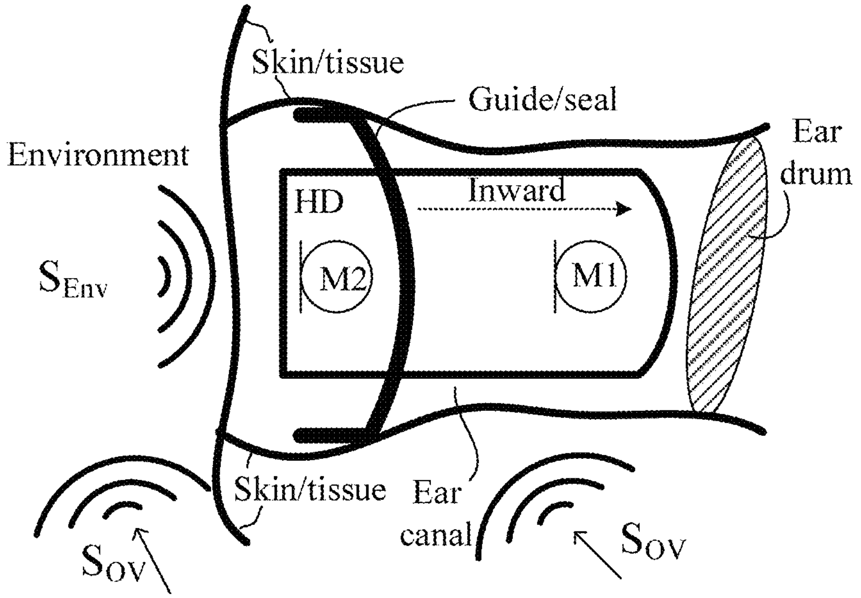
Figure 4C:
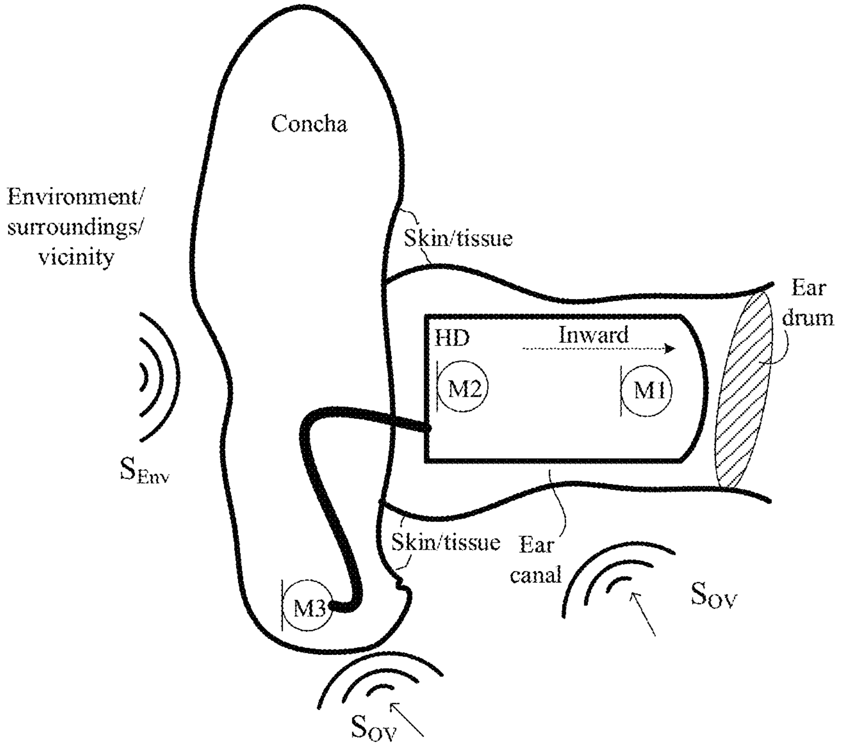

The second microphone (M2) may in another embodiment be located in the ear canal away from its opening ('Ear canal opening') in a direction towards the eardrum, e.g. confined to the soft (non-bony) part of the ear canal, e.g. less than 10 mm from the opening (cf. e.g. FIG. 4A, 4B, 4C).

In general, the second microphone (M2) may be located a distance away from the first microphone (M1), e.g. in the same physical part of the hearing device (e.g. an earpiece) as the first microphone (as e.g. shown in FIG. 2A, 2B, and FIG. 3), e.g. so that the first and second microphones are located on a line parallel to a 'longitudinal direction of the ear canal' (cf. e.g. FIG. 1A, 1B, 1E, 2A, 2B). The second microphone (M2) may, however, be located in an ATE part (ATE=At the ear) separate from the earpiece. The ATE part may be adapted to be located outside the ear canal, e.g. in concha (cf. e.g. FIG. 1C, 1D, 4C, 4D), or at or behind Pinna or elsewhere at or around the ear (pinna), e.g. on a boom arm reaching towards the mouth of the user (e.g. FIG. 4E), when the hearing device is mounted (ready for normal operation) on the user.

The hearing device of FIG. 2A, 2B may represent a headset as well as a hearing aid.

The distance between the first and second input transducers, e.g. microphones (M1, M2), may be in the range from 5 mm to 100 mm, such as between 10 mm and 50 mm, or between 10 mm and 30 mm.

The hearing device (HD) may comprise three or more input transducers, e.g. microphones, e.g. one or more located on a boom arm pointing towards the user's mouth (such microphone(s) being e.g. located in the $2^{nd}$ acoustic environment). Two of the at least three microphones may be located around and just outside, respectively, the ear canal opening, e.g. 10-20 mm outside (in the $2^{nd}$ acoustic environment). Two of the at least three microphones may e.g. be located in the ear canal relatively close to the ear drum, e.g. in the $1^{st}$ or $2^{nd}$ acoustic environment.

The first microphone may be located at or in the ear canal. The first microphone may be located closer to the ear drum than the second microphone. The second microphone may be located closer to the ear drum than a third microphone, etc.

The first and second microphones may be located at or in the ear canal of the user so that they experience first and second acoustic environments, wherein the first and second acoustic environments are at least partially acoustically isolated from each other when the user wears the hearing device, e.g. a headset. In the below table, internal and external may refer to first and second, respectively.

Properties (in a relative sense) of the first ('internal') and second ('external') input transducers

| | Spectral shape ('coloring') | SNR | Noise |
|---|---|---|---|
| Internal ($1^{st}$) mic. | − | + | + (point-like) |
| External ($2^{nd}$) mic. | + | − | − (diffuse) |

The first (internal) input transducer signal has the advantage of a good SNR (some of the noise from the environment has been filtered out by the directional properties of the outer ear and head and possibly torso), and the noise source (cf. 'Noise' in the table) will hence be more localized (point like), which facilitates its attenuation by a null (or minimum) of the beamformer in the direction away from the ear (e.g. perpendicular to the side of the head, and definitely not in a direction of the mouth, so the chance of (accidentally) attenuating the target signal is minimal). The spectral shape (coloring) of the signal from the first input transducer may, however, depending on the actual location (depth) in the ear canal and the degree of sealing of the first input transducer be poorer (e.g. confined to lower frequencies, e.g. less than 2 or 3 kHz) and thus sounding un-natural, if listened to. The first electric input signal from the first (internal) input transducer may experience a boost in dependence on leakage and residual volume. This boost is therefore difficult to "calibrate".

The second ('external' (or 'less internal')) input transducer signal has the advantage of a good spectral shape that makes it more pleasant for a (far end listener) to listen to, but it has the downside of being 'polluted' by noise from the environment (which may be at least partially removed by spatial filtering (beamforming) and optionally post-filtering). But compared to the first input transducer, the second input transducer may experience a more diffuse noise distribution.

The hearing device may preferably comprise a beamformer, e.g. an MVDR beamformer, configured to provide an estimate of the user's voice based on beamformer weights applied to the first and second electric input signals. A property of an MVDR beamformer is that it will always provide a beamformed signal that exhibits an SNR that is larger than or equal to any of the input signals (it does not destroy SNR). In the present case, the 'external' (second) input transducer may preferably be the reference microphone for which a 'distortionless response' is provided by the MVDR-beamformer.

The filter weights (w) of the MVDR-beamformer may be adaptively determined. Typically, the noise field (e.g. represented by a noise covariance matrix $C_v$) is updated during speech pauses of the user (no OWN-voice), or speech pauses in general (no voice). The transfer functions $d_{ov,i}$ from the user's mouth to each of the at least two microphones ($i=1, \ldots, M$, $M \geq 2$) may be determined in advance of use of the hearing device or be adaptively determined during use (e.g. when the hearing device is powered up or repeatedly during use), when the user's own voice is present (and preferably when the noise level is Sbelow a threshold value). The transfer functions $d_{ov,1}$ from the user's mouth to each of the at least two microphones (i=1, . . . , M, M≥2) may be represented by a look vector $d_{ov}=(d_{ov,1} \ldots, d_{ov,M})^T$, where superscript T indicates transposition.

In case the first input transducer is in acoustic communication with the environment, the MVDR-beamformer may rely on a predetermined look vector (e.g. determined in advance of use of the hearing device). In case the first input transducer is occluded (substantially (acoustically) sealed off from the environment), the look vector of the MVDR-beamformer may be adaptively updated.

Figure 3:
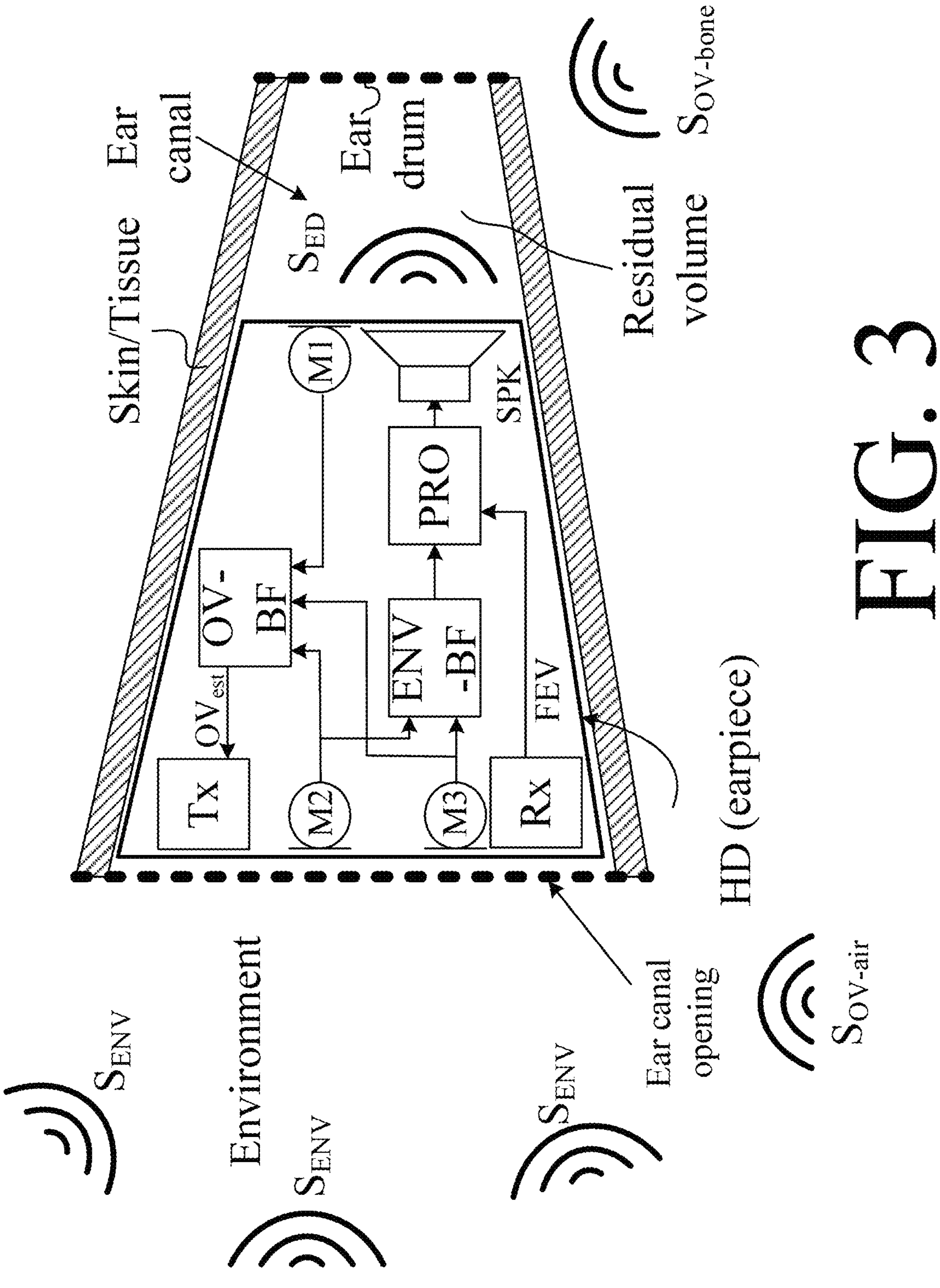

FIG. 3 shows an embodiment of a hearing device, e.g. a headset or a hearing aid, according to the present disclosure. The hearing device (HD) of FIG. 3 comprises or is constituted by an earpiece configured to be inserted into an ear canal of a user. The hearing device comprises three microphones (M1, M2, M3), a loudspeaker (SPK), a processor (PRO) and first and second beamformers (OV-BF, ENV-BF) e.g. for, respectively, providing an estimate of the user's voice and optionally an estimate of a sound signal from the environment, e.g. a target speaker, respectively (e.g. activated in two different modes of operation). The hearing device (HD) may further comprise respective transmitters (Tx) and receivers (Rx) for transmitting the estimate of the user's voice ($OV_{est}$) to another device and for receiving a signal representative of sound (FEV) from another device, respectively. The first microphone (M1) is located in the earpiece at an eardrum-facing surface suitable for picking up sound from the residual volume ('Residual volume'). The second and third microphones (M2, M3) are located in the earpiece at an environment-facing surface suitable for picking up sound from the environment. The own voice beamformer (OV-BF) is configured to provide the (spatially filtered) estimate of the user's own voice, e.g. based on the three electric input signals from the three microphones (M1, M2, M3), or at least from M1, M2. The environment beamformer (ENV-BF) is e.g. configured to provide the estimate of sound from the environment based on the second and third microphones (M2, M3). The earpiece of the hearing device (HD) of FIG. 3 is shown to follow the (schematic) form of the ear canal of the user (e.g. due to customization of the earpiece). Thereby an improved estimate of the user's own voice may be provided. The earpiece may comprise a ventilation channel (e.g. an (electrically) controllable ventilation channel).

Figure 7A:
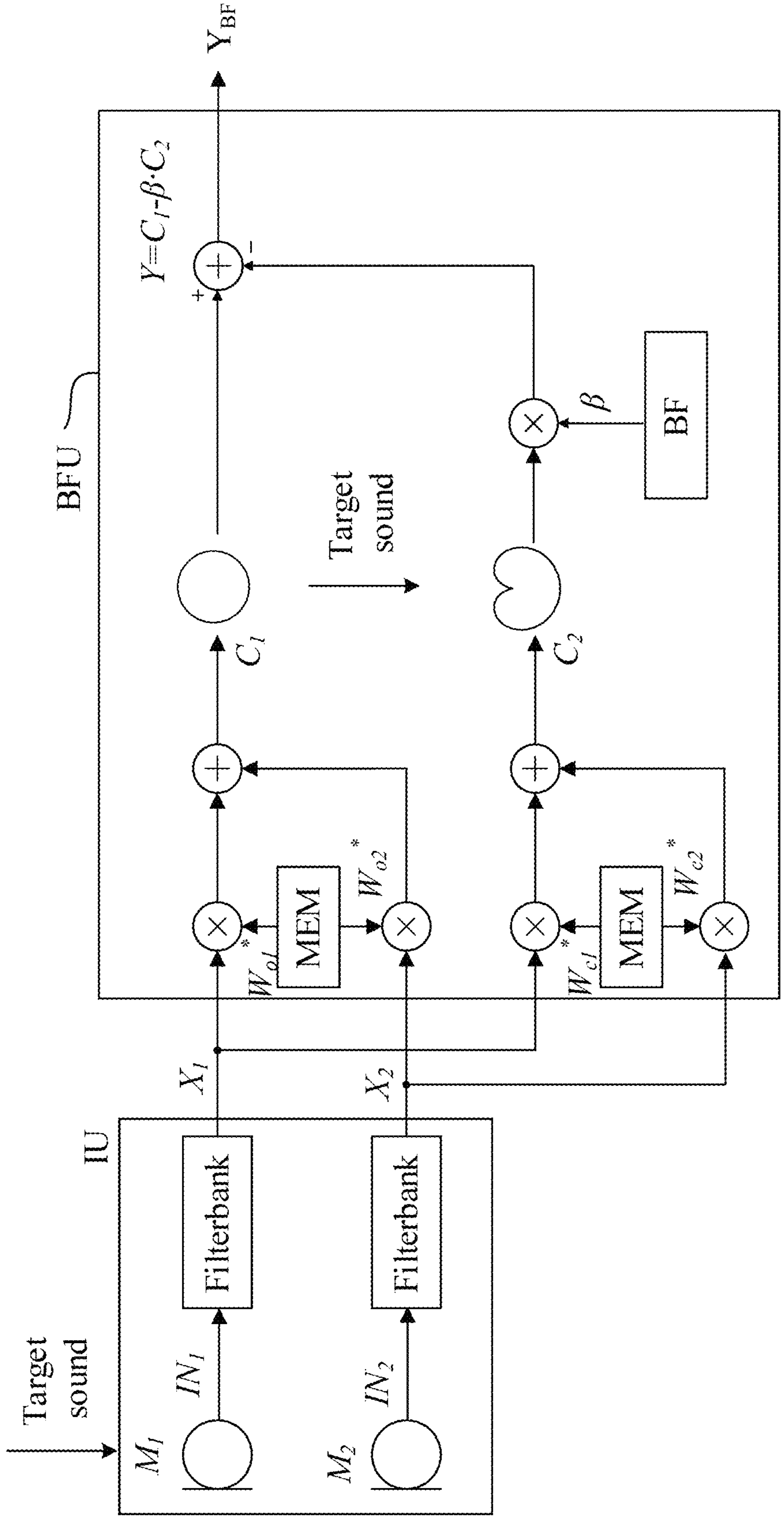
FIG. 7A shows an embodiment of an adaptive beamformer filtering unit for providing a beamformed signal based on two microphone inputs, FIG. 7B an adaptive (own voice) beamformer configuration, comprising an omnidirectional beamformer and a target cancelling beamformer, respectively, and, based on smoothed versions thereof, the adaptation factor $\beta(k)$ is determined.

FIG. 4A-4E shows embodiments of a hearing device HD, e.g. a hearing aid or a headset, or an ITE-part (earpiece) thereof, in the context of own voice estimation. Only the input transducers are shown in the ITE-part of the hearing device of FIG. 4A-4E to focus on their number and location, while other components of the hearing device are implicit, e.g. located in other parts of the hearing device, e.g. a BTE-part (see e.g. FIG. 9). The electric input signals provided by the shown microphones are assumed to be used as inputs to a beamformer (e.g. an MVDR beamformer) for providing the estimate of the user's own voice. An example of a block diagram of such own voice beamformer is shown in FIG. 7C. The possible symmetry of binaural in-ear microphones (i.e. microphones located at or in left and right ears, respectively) may improve the quality of the own voice estimate.

The hearing device of FIG. 4A comprises first and second microphones (M1, M2). The first microphone is located in the earpiece closer to the ear drum ('eardrum') than the second microphone (M2). The earpiece is partially occluding the ear canal thereby creating a separation between first and second acoustic environments for the first and second microphones. Thereby, the first microphone (M1) is predominantly exposed to a bone conducted version of the user's own voice, while the second microphone (M2) is predominantly exposed to an air borne version of the user's own voice.

In the embodiment of FIG. 4B, the earpiece further comprises a guide or seal ('Guide/seal') configured to at least partially seal a residual volume ($1^{st}$ acoustic environment), wherein the first microphone (M1) is located, from the environment ($2^{nd}$ acoustic environment), where the second microphone (M2) is located. The earpiece/ITE-part may further be customized to the ear canal of the user, e.g. to thereby increase the effect of the sealing (i.e. to minimize leakage) between housing and walls ('Skin/tissue') of the ear canal ('Ear canal'). Sound from an external sound source (e.g. in the acoustic far filed of the user) is indicated by $S_{ENV}$. Sound from the user's mouth is indicated by a solid arrow denoted Soy. By the seal and possible customization of the earpiece, the differences between the properties of the $1^{st}$ and $2^{nd}$ environments will be enhanced and a quality of the own voice estimate may be increased.

In the embodiment of FIG. 4C, the hearing device comprises a third microphone (M3) compared to the first and second microphones of the embodiment of FIG. 4A or 4B. The third microphone is located in a direction towards the mouth of the user, and thus in the $2^{nd}$ acoustic environment, aimed at picking up air-borne signals, including such signals from the user's mouth. FIG. 4C does not include a seal, but a seal between a housing of the ITE-part of the hearing device will improve the isolation between the $1^{st}$ and $2^{nd}$ environments (cf. structure 'Guide/seal' in FIG. 4B or 'Guide', 'Seal' in FIG. 2A). The same can be said of the embodiment of FIG. 4D. Dependent on the sealing effect of the haring device, the first microphone M1 facing the eardrum has significantly higher SNR compared to the second and third microphones M2, M3 facing the environment.

Figure 4D:
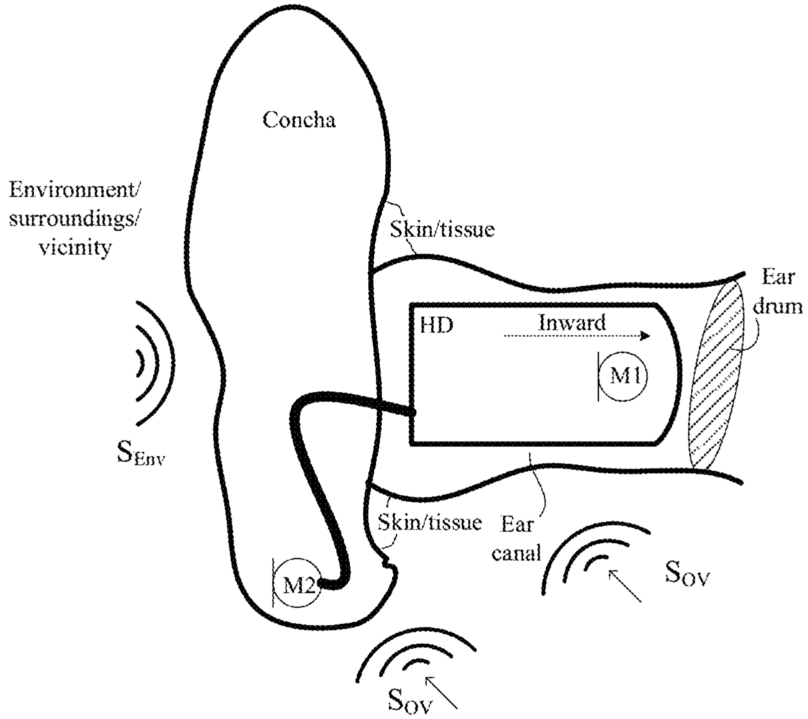

The embodiment of FIG. 4D is equal to the embodiment of FIG. 4C except that it only contains two microphones (M1, M2). In the embodiment of FIG. 4D, the second microphone (M2) is located in a direction towards the mouth of the user (at the location of the additional third microphone of the embodiment of FIG. 4C). Again, the second microphone (M2) is located in a $2^{nd}$ acoustic environment where it will predominantly receive air conducted sound (including air-conducted sound from the user's mouth).

Figure 4E:
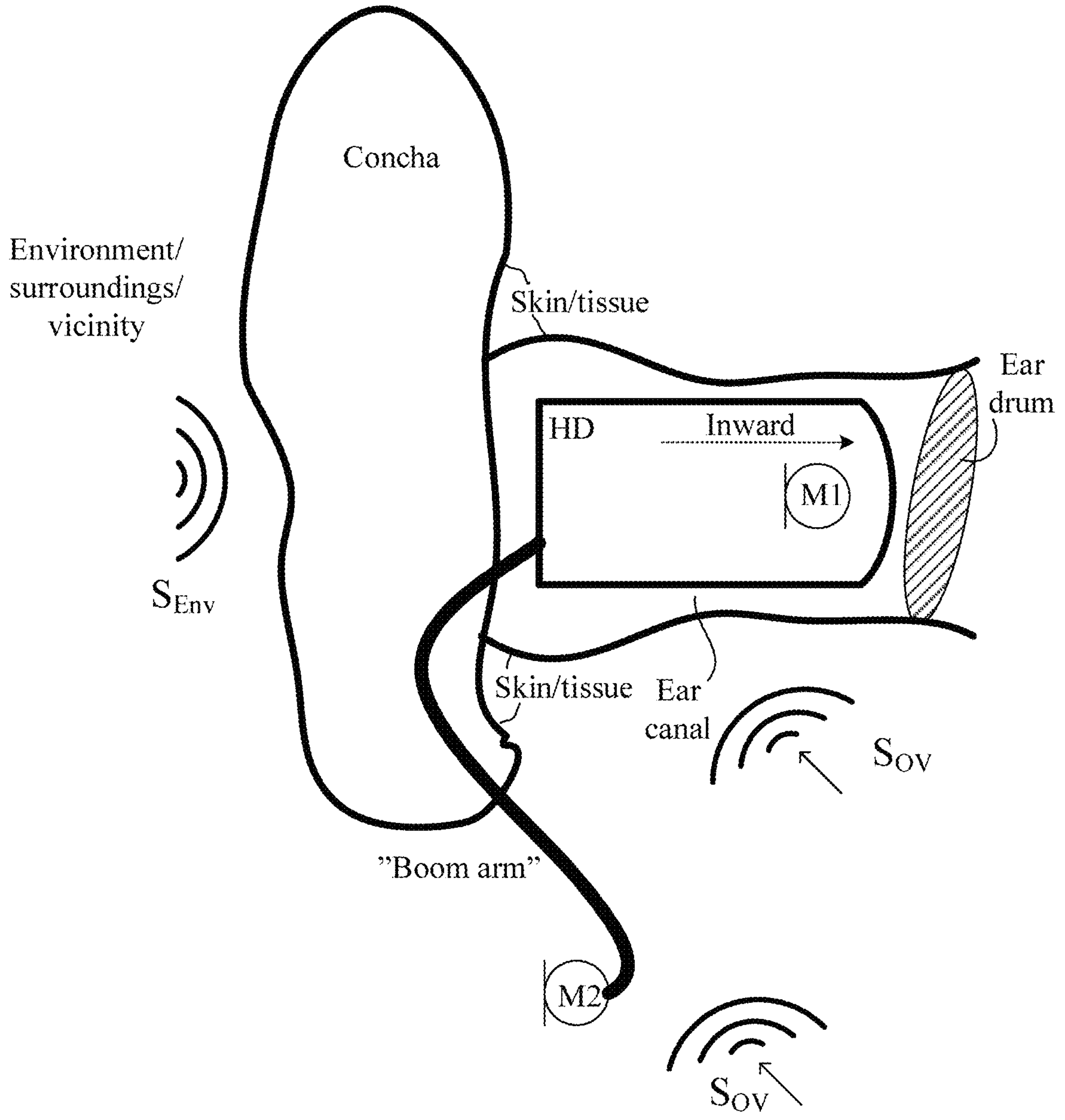

The embodiment of FIG. 4E is equal to the embodiment of FIG. 4D except that the second microphone (M2) is located outside the outer ear (pinna), e.g. on a boom arm directed towards the mouth of the user (thereby—other things being equal—increasing the SNR of the (own voice) signal received by the microphone. Again, the second microphone (M2) is located in a $2^{nd}$ acoustic environment, where it will predominantly receive air conducted sound (including air-conducted sound from the user's mouth).

Figure 5A:
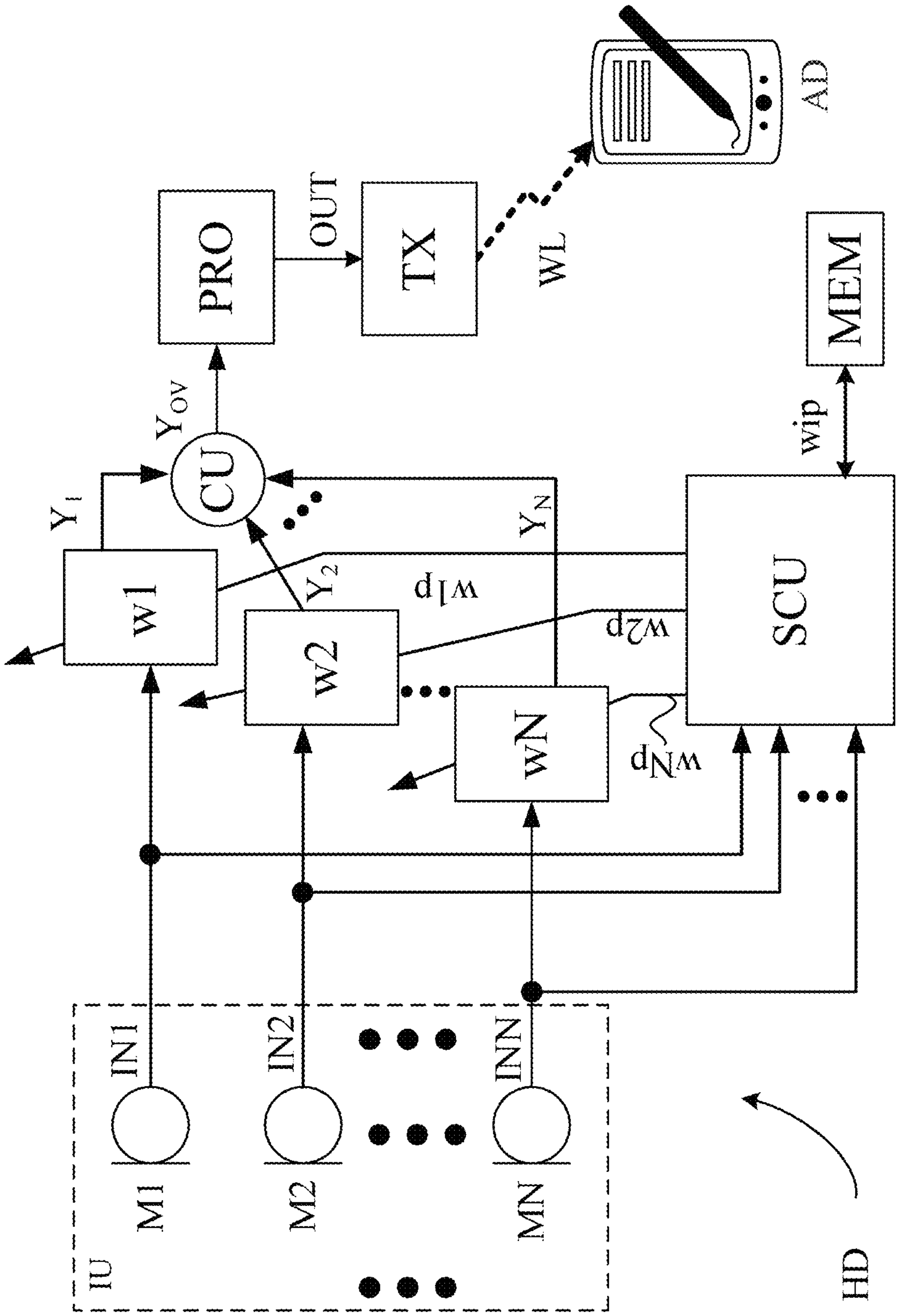
FIG. 5A shows a first embodiment of a microphone path of a hearing device from an input unit to a transmitter for providing an estimate of an own voice of a user wearing the hearing device and transmitting the estimate to another device or system.
Figure 5B:
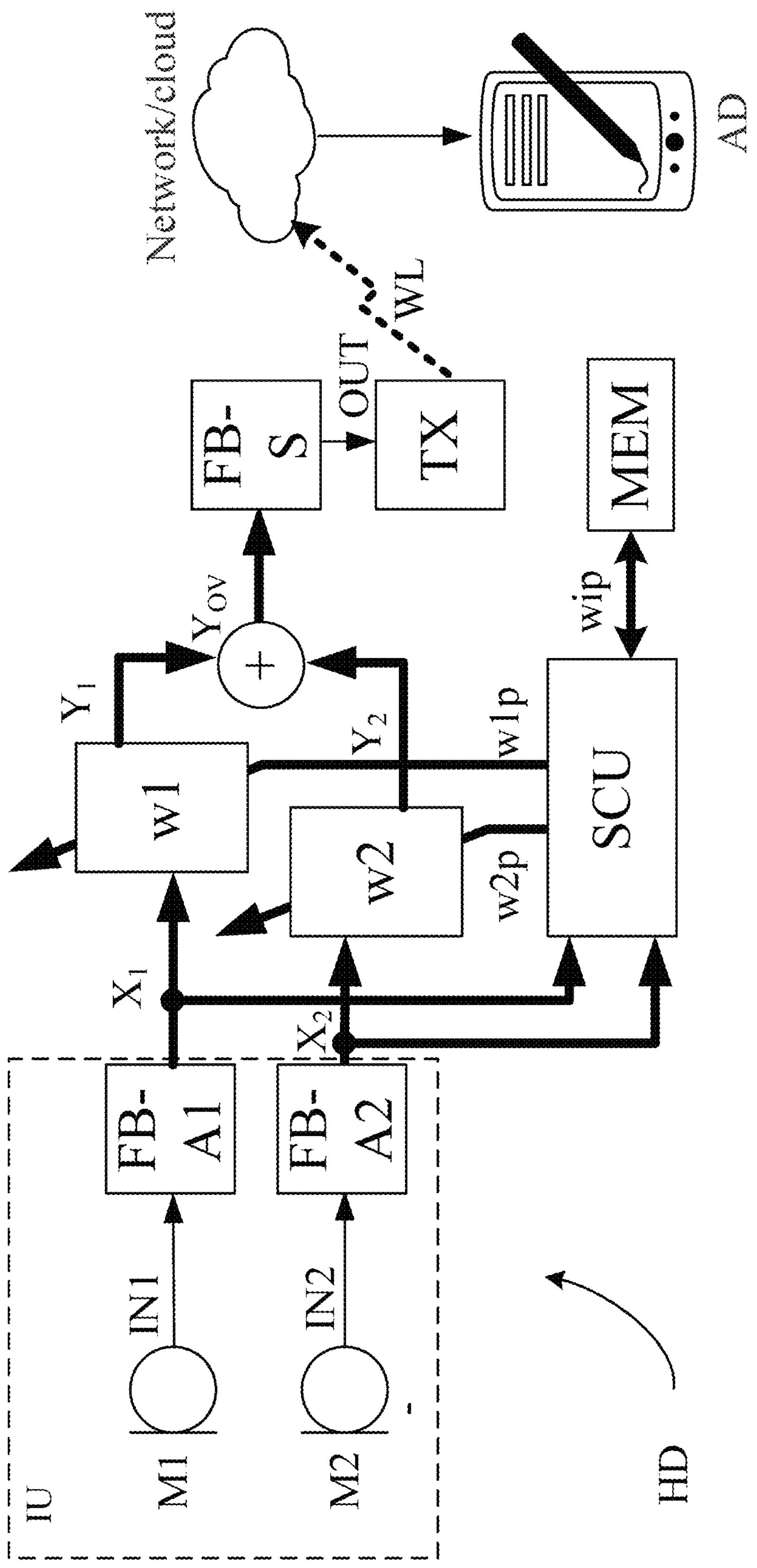
FIG. 5B shows a second embodiment of a microphone path of a hearing device from an input unit to a transmitter for providing an estimate of an own voice of a user wearing the hearing device and transmitting the estimate to another device or system.

FIGS. 5A and 5B schematically illustrate respective first and second embodiments of a microphone path of a hearing device from an input unit to a transmitter for providing an estimate of an own voice of a user wearing the hearing device and transmitting the estimate to another device or system.

Now referring to FIG. 5A, which illustrates an embodiment of a part of a hearing device comprising a directional system according to the present disclosure. The hearing device (HD) is configured to be located at or in an ear of a user, e.g. fully or partially in an ear canal of the user. The hearing device comprises an input unit IU comprising a multitude (N) of input transducers (M1, . . . , MN) (here microphones) for providing respective electric input signals (IN1, IN2, . . . , INN) representing sound in an environment of the user. The hearing device further comprises a transmitter (Tx) for wireless communication with an external device (AD), e.g. a telephone or other communication device. The hearing device further comprises a spatial filter or beamformer (w1, w2, . . . , wN, CU) connected to the input unit IU configured to provide a spatially filtered output signal $Y_{OV}$ based on the multitude of electric input signals and configurable beamformer weights w1*p*, w2*p*, . . . , wNp, where p is a beamformer weight set index. The spatial filter comprises weighting units w1, w2, . . . , wN, e.g. multiplication units, each being adapted to apply respective beamformer weights w1*p*, w2*p*, . . . , wNp (from the $p^{th}$ set of beamformer weights) to the respective electric input signals IN1, IN2, . . . , INN and to provide respective weighted input signals $Y_1$, $Y_2$, . . . , $Y_N$. The weighting units w1, w2, . . . , wN, may in an embodiment e.g. be implemented as linear filters in the time domain. The spatial filter further comprises a combination unit CU, e.g. a summation unit, for combining the weighted (or linearly filtered) input signals to one or more spatially filtered signals, here one, the beamformed signal $Y_{OV}$ comprising an estimate of the user's own voice, which is fed to the transmitter Tx for transmission to another device or system (e.g. to a telephone of a network device (AD) via a wireless link (WL)). In the embodiment of FIG. 5A, the beamformed signal $Y_{OV}$ is fed to an optional processor (PRO), e.g. for applying one or more processing algorithms e.g. further noise reduction, to the beamformed signal $Y_{OV}$ from the spatial filter/beamformer) before the processed signal OUT is forwarded to the transmitter (Tx).

The hearing device (HD), e.g. the beamformer, further comprises a spatial filter controller SCU configured to apply at least a first set (p=1) of beamformer weights (w1*p*, w2*p*, . . . , wNp) (or linear filters, e.g. FIR-filters) to the multitude of electric input signals (IN1, IN2, . . . , INN). The first set of beamformer weights (p=1) (or linear filters) is applied to provide spatial filtering of an external sound field (e.g. from a sound source located at the user's mouth), cf. signals ($Y_1$, $Y_2$, . . . , $Y_N$). The hearing device further comprises a memory MEM accessible from the spatial filter controller SCU. The spatial filter controller SCU is configured to adaptively select an appropriate set of beamformer weights (signal wip) (or linear filters) among two or more sets (p=1, 2, . . . ) of beamformer weights (or linear filters) stored in the memory (including the first set of beamformer weights (or linear filters)). At a given point in time, an appropriate set of beamformer weights (or linear filters) may e.g. be selected from sets of different beamformer weights (or linear filter coefficients) stored in the memory or such appropriate (updated) beamformer weights (or linear filters) may be adaptively determined, e.g. dependent of a change in source location (e.g. in a case where the user's own voice is NOT of interest). The beamformer weights (or filter coefficients of linear filters, e.g. FIR-filters) may be determined by any method known in the art, e.g. using the MVDR procedure.

The part of a hearing device illustrated in FIG. 5A may implement a microphone path from input transducer to wireless transceiver of a normal headset or of a hearing aid in a specific communication mode of operation (e.g. a telephone mode). The hearing device may of course additionally comprise an output unit comprising an output transducer, e.g. a loudspeaker for presenting stimuli perceivable as sound to the user of the hearing device, either e.g. in the form of voice from a remote communication partner received via a wireless receiver and/or sound from the environment of the user picked up by input transducers of the hearing device. The same can be said of the embodiment of FIG. 5B. The microphone path may be provided in the time domain or in the frequency domain (here termed 'time-frequency domain' to indicate that the frequency spectra are (typically) time variant)).

The embodiment of FIG. 5B is similar to the embodiment of FIG. 5A but exhibits the following differences. The input unit (IU) of the hearing device of FIG. comprises two input transducers in the form of microphones (M1, M2) and two analysis filter banks (FB-A1, FB-A2) for providing the respective electric input signals (IN1, IN2) as frequency sub-band signals $X_1$, $X_2$ in a time-frequency representation (k,m), where k and m are frequency and time indices, respectively. Correspondingly, the beamformer receives two input signals $X_1$, $X_2$ in K frequency bands (k=1, . . . , K) and provides beamformer weights w1*p*(*k*), w2*p*(*k*) in K frequency bands, which are applied to the respective electric input signals $X_1$, $X_2$ in filter units (w1, w2). The filtered signals (Y1, Y2) are added together in the SUM unit '+', (implemented as combination unit (CU) in FIG. 5A). In the embodiment of FIG. 5B, the own voice estimate $Y_{OV}$ from the beamformer is fed directly to a synthesis filter bank (FB-S) providing a resulting signal (OUT) as a time-domain signal. The output signal OUT comprising the own voice estimate is fed to the transmitter and sent to the external device or system (AD) via wireless link (WL) and/or a Network or the cloud. The number of frequency bands can be any larger than 2, e.g. 8 or 24 or 64, etc.

Figure 6:
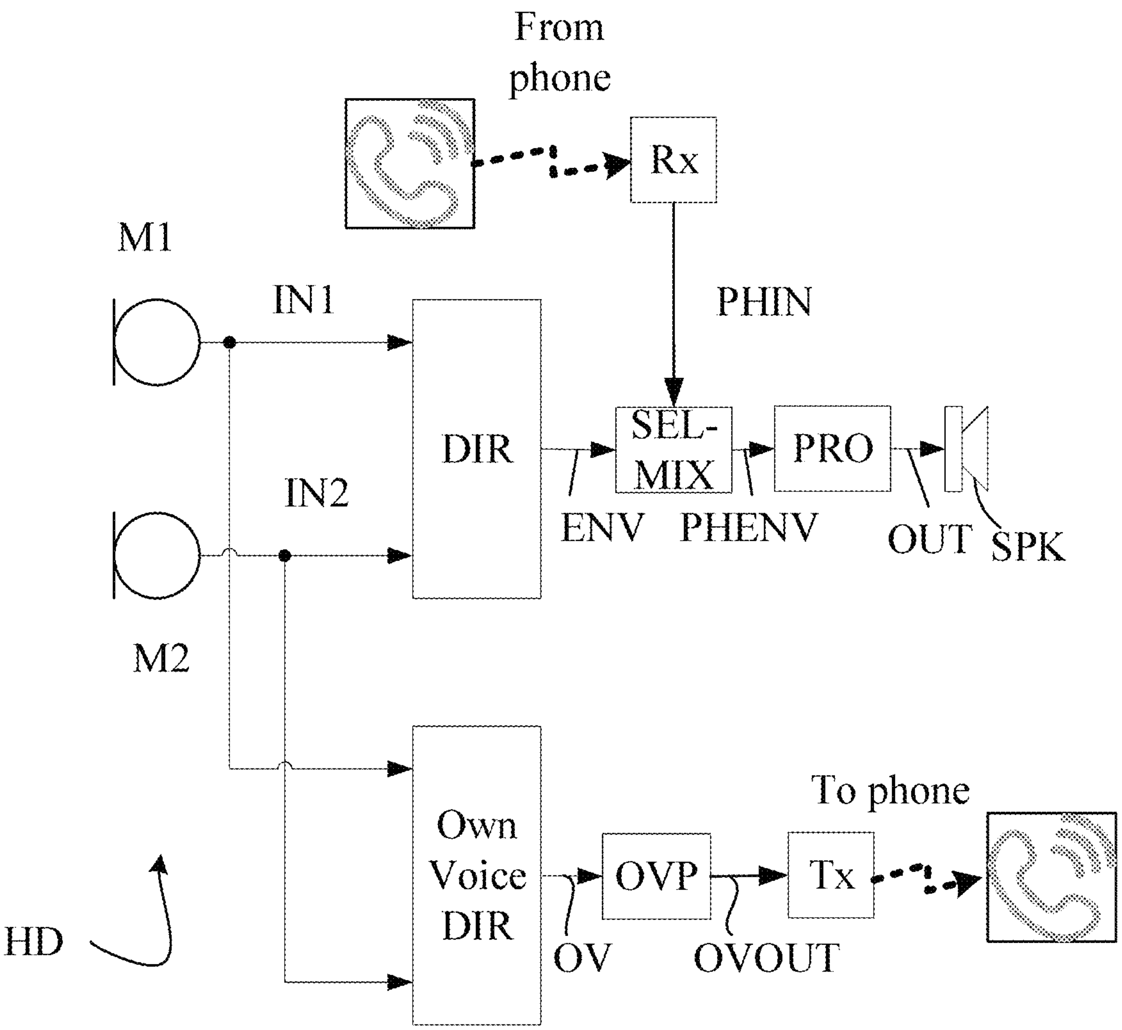
FIG. 6 shows an embodiment of a headset or a hearing aid comprising own voice estimation and the option of transmitting the own voice estimate to another device, and to receive sound from another device for presentation to the user via a loudspeaker, e.g. mixed with sound from the environment of the user.

FIG. 6 shows an embodiment of a headset or a hearing aid comprising own voice estimation and the option of transmitting the own voice estimate to another device, and to receive sound from another device for presentation to the user via a loudspeaker, e.g. mixed with sound from the environment of the user. FIG. 6 shows an embodiment of a hearing device (HD), e.g. a hearing aid, comprising two microphones (M1, M2) to provide electric input signals IN1, IN2 representing sound in the environment of a user wearing the hearing device. The hearing device further comprises spatial filters DIR and Own Voice DIR, each providing a spatially filtered signal (ENV and OV respectively) based on the electric input signals. The spatial filter DIR may e.g. implement a target maintaining, noise cancelling, beamformer. The spatial filter Own Voice DIR is a spatial filter according to the present disclosure. The spatial filter Own Voice DIR implements an own voice beamformer directed at the mouth of the user (its activation being e.g. controlled by an own voice presence control signal, and/or a telephone mode control signal, and/or a far-end talker presence control signal, and/or a user initiated control signal). In a specific telephone mode of operation, the user's own voice is picked up by the microphones M1, M2 and spatially filtered by the own voice beamformer of spatial filter 'Own Voice DIR' providing signal OV, which—optionally via own voice processor (OVP)—is fed to transmitter Tx and transmitted (by cable or wireless link to a another device or system (e.g. a telephone, cf. dashed arrow denoted 'To phone' and telephone symbol). In the specific telephone mode of operation, signal PHIN may be received by (wired or wireless) receiver Rx from another device or system (e.g. a telephone, as indicated by telephone symbol and dashed arrow denoted 'From Phone'). When a far-end talker is active, signal PHIN contains speech from the far-end talker, e.g. transmitted via a telephone line (e.g. fully or partially wirelessly, but typically at least partially cable-borne). The 'far-end' telephone signal PHIN may be selected or mixed with the environment signal ENV from the spatial filter DIR in a combination unit (here selector/mixer SEL-MIX), and the selected or mixed signal PHENV is fed to output transducer SPK (e.g. a loudspeaker or a vibrator of a bone conduction hearing device) for presentation to the user as sound. Optionally, as shown in FIG. 6, the selected or mixed signal PHENV may be fed to processor PRO for applying one or more processing algorithms to the selected or mixed signal PHENV to provide processed signal OUT, which is then fed to the output transducer SPK. The embodiment of FIG. 6 may represent a headset, in which case the received signal PHIN may be selected for presentation to the user without mixing with an environment signal. The embodiment of FIG. 6 may represent a hearing aid, in which case the received signal PHIN may be mixed with an environment signal before presentation to the user (to allow a user to maintain a sensation of the surrounding environment; the same may of course be relevant for a headset application, depending on the use-case). Further, in a hearing aid, the processor (PRO) may be configured to compensate for a hearing impairment of the user of the hearing device (hearing aid).

Example of an Own-Voice Beamformer:

An adaptive (own voice) beamformer may comprise a first set of beamformers $C_1$ and $C_2$, wherein the adaptive beamformer filter is configured to provide a resulting directional signal (comprising an estimate of the user's own voice) $Y_{BF}(k)=C_1(k)-\beta(k)C_2(k)$, where β(k) is an adaptively updated adaptation factor. This is illustrated in FIG. 7A.

The beamformers $C_1$ and $C_2$ may comprise

- a beamformer $C_1$ which is configured to leave a signal from a target direction un-altered, and
- an orthogonal beamformer $C_2$ which is configured to cancel the signal from the target direction.

In this case, the target direction is the direction of the user's mouth (the target sound source is equal to the user's own voice).

FIG. 7A shows a part of a hearing device comprising an embodiment of an adaptive beamformer filtering unit (BFU) for providing a beamformed signal based on two microphone inputs. The hearing device comprises first and second microphones ($M_1$, $M_2$) providing first and second electric input signals $IN_1$ and $IN_2$, respectively and a beamformer providing a beamformed signal $Y_{BF}$ (here $Y_{OV}$) based on the first and second electric input signals. A direction from the target signal to the hearing aid is e.g. defined by the microphone axis and indicated in FIG. 7A by arrow denoted Target sound. The target direction can be any direction, e.g., as here, a direction to the user's mouth (to pick up the user's own voice). An adaptive beam pattern (Y (Y(k))), for a given frequency band k, k being a frequency band index, is e.g. obtained by linearly combining an omnidirectional delay-and-sum-beamformer ($C_1$ ($C_1(k)$)) and a delay-and-subtract-beamformer ($C_2$ ($C_2(k)$)) in that frequency band. The adaptive beam pattern arises by scaling the delay-and-subtract-beamformer ($C_2(k)$) by a complex-valued, frequency-dependent, adaptive scaling factor β(k) (generated by beamformer BF) before subtracting it from the delay-and-sum-beamformer ($C_1(k)$), i.e. providing the beam pattern Y, $$Y(k) = C_1(k) - \beta(k)C_2(k).$$

It should be noted that the sign in front of β(k) might as well be +, if the sign(s) of the beamformer weights constituting the delay-and-subtract beamformer $C_2$ are appropriately adapted. The beamformed signal $Y_{BF}$ is expressed as $Y_{BF}=Y_{OV}=(\mathbf{w}_{C1}(k)-\beta(k)\cdot\mathbf{w}_{C2}(k))^H\cdot\mathbf{IN}(k)$, where bold face (x) indicates a vector, e.g. $\mathbf{IN}(k)=(IN_1(k), IN_2(k))$, in case of two electric input signals, as illustrated in FIG. 7A (in which case β(k) is a scalar, but in a general case, with more input signals, a matrix). The beamformer weights ($\mathbf{w}_{C1}(k)$, $\mathbf{w}_{C2}(k)$) may be predefined and stored in a memory (MEM) of the hearing device. The beamformer weights may be updated during use, e.g. either provoked by certain events (e.g. power on), or adaptively.

The beamformer (BFU) may e.g. be adapted to work optimally in situations where the microphone signals consist of a point-noise target sound source in the presence of additive noise sources. Given this situation, the scaling factor β(k) (β in FIG. 7A) is adapted to minimize the noise under the constraint that the sound impinging from the target direction (at least at one frequency) is essentially unchanged. For each frequency band k, the adaptation factor β(k) can be found in different ways.

The adaptation factor β(k) may be expressed as $$\beta(k) = \frac{\langle C_2^* C_1 \rangle}{\langle |C_2|^2 \rangle + c}$$

where * denotes the complex conjugation and ⟨•⟩ denotes the statistical expectation operator, which may be approximated in an implementation as a time average, k is the frequency index, and c is a constant (e.g. 0). The expectation operator ⟨•⟩ may be implemented using e.g. a first order IIR filter, possibly with different attack and release time constants. Alternatively, the expectation operator may be implemented using a FIR filter.

In a further embodiment, the adaptive beamformer processing unit is configured to determine the adaptation parameter $\rho_{opt}(k)$ from the following expression $$\beta_{opt} = \frac{w_{C1}^H C_v w_{C2}}{w_{C2}^H C_v w_{C2}},$$

where $w_{C1}$ and $w_{C2}$ are the beamformer weights for the delay and sum $C_1$ and the delay and subtract $C_2$ beamformers, respectively, $C_v$ is the noise covariance matrix, and H denotes Hermitian transposition.

The adaptive beamformer (BF) may e.g. be implemented as a generalized sidelobe canceller (GSC) structure, e.g. as a Minimum Variance Distortionless Response (MVDR) beamformer, as is known in the art.

Figure 7B:
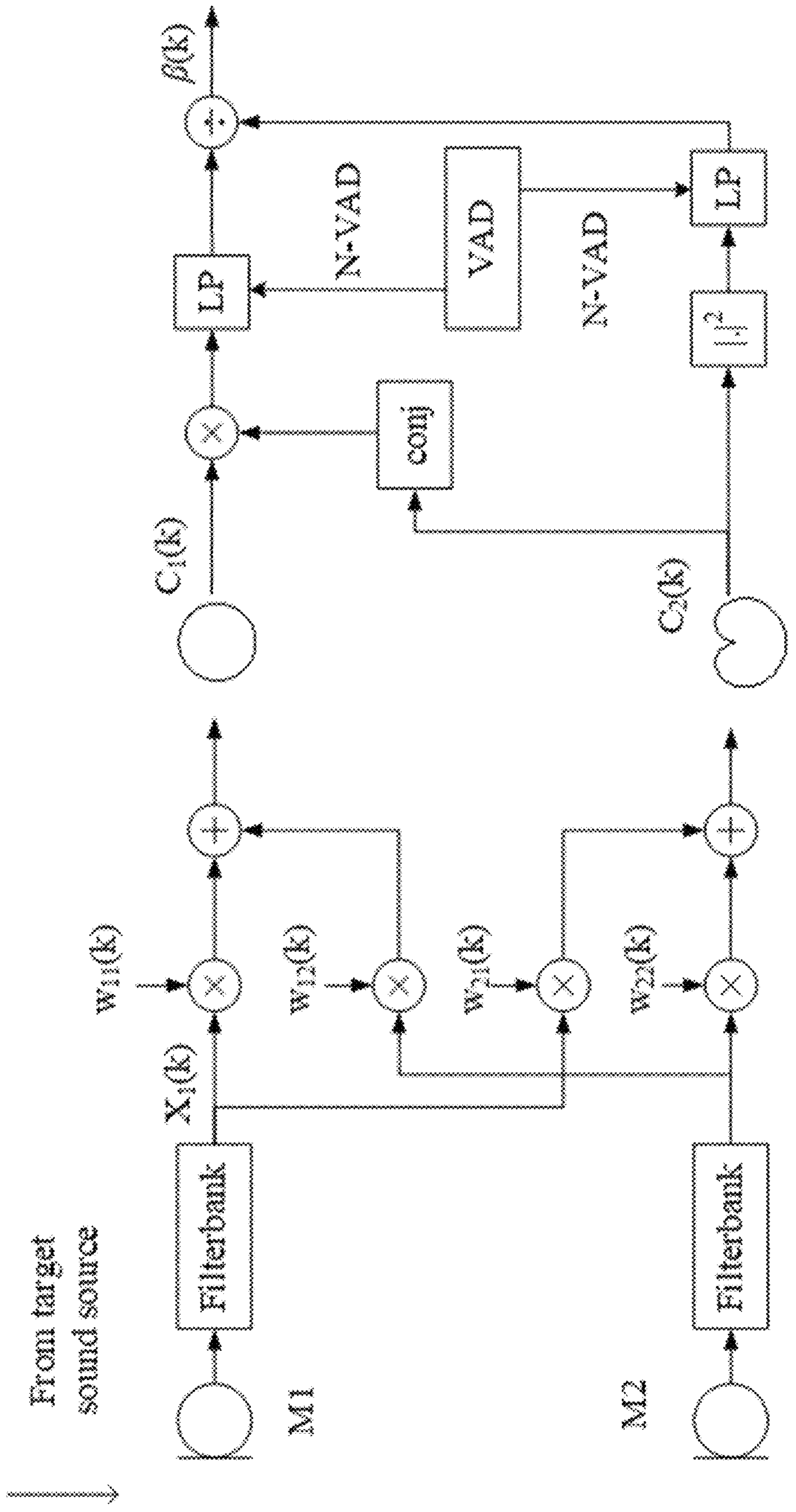
FIG. 7C shows an embodiment of an own voice beamformer including a post filter, e.g. for the telephone or headset mode illustrated in FIG. 6.
Figure 7C:
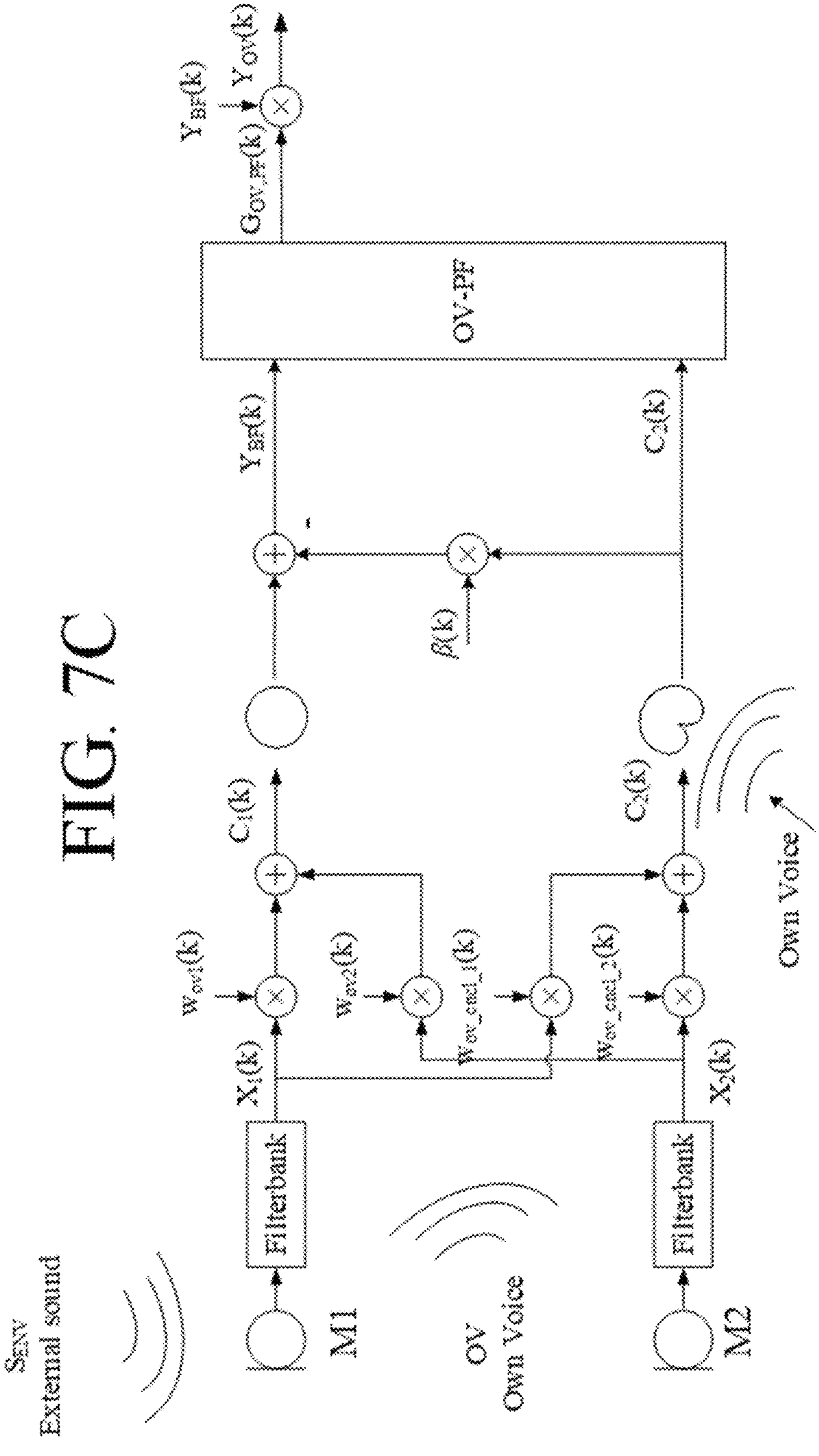

FIG. 7B shows an adaptive (own voice) beamformer configuration, an omnidirectional beamformer and a (own voice) target cancelling beamformer, respectively, are smoothed, and based thereon, the adaptation factor β(k) is determined. FIG. 7B implements an embodiment of a determination of the adaptive parameter $$\beta(k) = \frac{\langle C_2^* C_1 \rangle}{\langle |C_2|^2 \rangle}$$

The beamformers $C_1(k)$ and $C_2(k)$ (defined by respective sets of complex beamformer weights ($w_{11}(k)$, $w_{12}(k)$) and ($w_{21}(k)$, $w_{22}(k)$)), as illustrated in FIG. 7B, define an omni-directional beamformer ($C_1(k)$) and a target (own voice) cancelling beamformer ($C_2(k)$), respectively. LP is an (optional) low-pass filtering (smoothing) unit. The unit (Conj) provides a complex conjugate of the input signal to the unit. The unit $|\bullet|^2$ provides a magnitude squared of the input signal to the unit. A voice activity detector (VAD) controls the smoothing units (LP) via control signal N-VAD to provide that β(k) is updated during speech pauses (noise only), FIG. 7C shows an embodiment of an own voice beamformer, e.g. for the telephone mode illustrated in FIG. 6, implemented using the configuration comprising two microphones. FIG. 7C shows an own voice beamformer according to the present disclosure including an own voice-enhancing post filter (OV-PF) providing post filter gain ($G_{OV,BF}(k)$), which is applied to the beamformed signal $Y_{BF}$. The own voice gains are determined on the basis of a current noise estimate, here provided by a combination of an own voice cancelling beamformer ($C_2(k)$), defined by (frequency dependent, cf. frequency index k) complex beamformer weights ($w_{ov\_cnc1\_1}(k)$, $w_{ov\_cnc1\_2}(k)$) and the output of the own voice beamformer ($Y_{BF}$) containing the own voice signal, enhanced by the own voice beamformer. In the embodiment of FIG. 7C, the own voice beamformer is adaptive, provided by adaptively updated parameter β(k), cf. e.g. FIG. 7B, so that $Y_{BF}=C_1(k)-\beta(k)-C_2(k)$. A direction from the user's mouth, when the hearing device is operationally mounted is schematically indicated (cf. solid arrow denoted 'Own Voice' in FIG. 7C). The resulting signal ($G_{OV,BF}(k)\, Y_{BF}(k)$), provides the (enhanced, noise reduced) own voice estimate $Y_{OV}(k)$. The own voice estimate may (e.g. in an own-voice mode of operation of the hearing aid, e.g. when a connection to a telephone or other remote device is established (cf. e.g. FIG. 6)) be transmitted to a remote device via a transmitter (cf. e.g. Tx in FIG. 6), (e.g. to a far-end listener of a telephone, cf. FIG. 6), or used in a keyword detector, e.g. for a voice control interface of the hearing device. In the 'own voice mode', noise from external sound sources may be reduced by the beamformer.

A binaural hearing system comprising first and second hearing devices (e.g. hearing aids, or first and second earpieces of a headset) as described above may be provided. The first and second hearing devices may be configured to allow the exchange of data, e.g. audio data, and with another device, e.g. a telephone, or a speakerphone, a computer (e.g. a PC or a tablet). Own voice estimation may be provided based on signals from microphones in the first and second hearing devices. Own voice detection may be provided in both hearing devices. A final own voice detection decision may be based on own voice detection values from both hearing devices or based on signals from microphones in the first and second hearing devices.

Figure 8A:
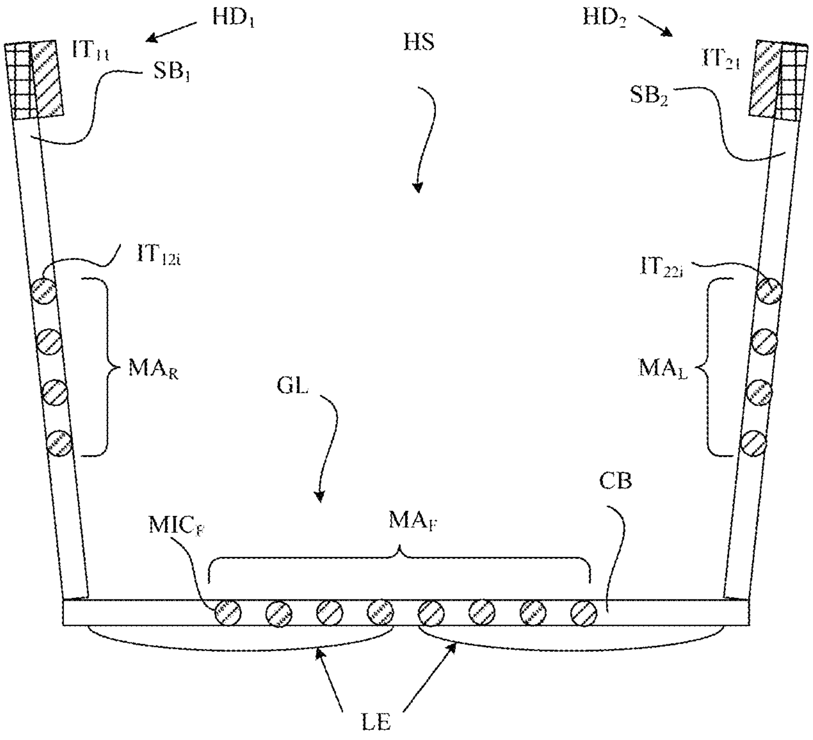
FIG. 8A shows a top view of an embodiment of a hearing system comprising first and second hearing devices integrated with a spectacle frame.
Figure 8B:
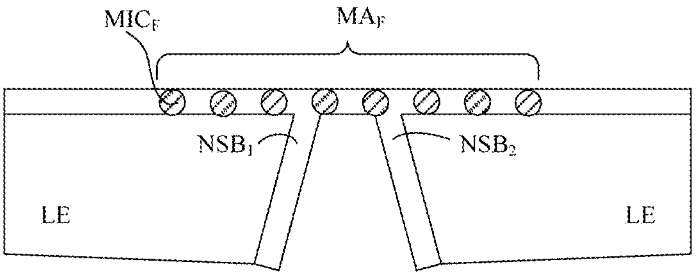
FIG. 8B shows a front view of the embodiment in FIG. 8A.
Figure 8C:
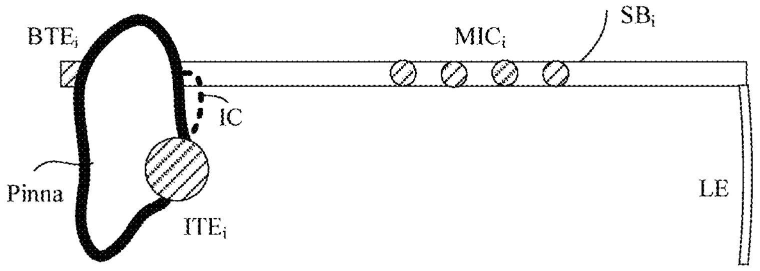
FIG. 8C shows a side view of the embodiment in FIG. 8A.

FIG. 8A shows a top view of a first embodiment of a hearing system comprising first and second hearing devices integrated with a spectacle frame. FIG. 8B shows a front view of the embodiment in FIG. 8A, and FIG. 8C shows a side view of the embodiment in FIG. 8A.

The hearing system (HS) according to the present disclosure comprises first and second hearing devices $HD_1$, $HD_2$ (e.g. first and second hearing aids of a binaural hearing aid system, or first and second ear pieces of a headset) configured to be worn on the head of a user comprising a head worn carrier, here embodied in a spectacle frame.

The hearing system comprises left and right hearing devices and a number of microphones and possibly vibration sensors mounted on the spectacle frame. Glasses or lenses (LE) of the spectacles may be mounted on the cross bar (CB) and nose sub-bars ($NSB_1$, $NSB_2$). The left and right hearing devices ($HD_1$, $HD_2$) comprises respective BTE-parts ($BTE_1$, $BTE_2$), and further comprise respective ITE-parts ($ITE_1$, $ITE_2$). The hearing system may further comprise a multitude of input transducers, here shown as microphones, and here configured in three separate microphone arrays ($MA_R$, $MA_L$, $MA_F$) located on the right, left side bars and on the (front) cross bar, respectively. Each microphone array ($MA_R$, $MA_L$, $MA_F$) comprises a multitude of microphones ($MIC_R$, $MIC_L$, $MIC_F$, respectively), here four, four and eight, respectively. The microphones may form part of the hearing system (e.g. associated with the right and left hearing devices ($HD_1$, $HD_2$), respectively, and contribute to localise and spatially filter sound from the respective sound sources of the environment around the user (and possibly in the estimation of the user's own voice). In an embodiment, all microphones of the system are located on the glasses and/or on the BTE part and/or in the ITE-part. The hearing system (e.g. the ITE-parts) may e.g. comprise electrodes for picking up body signals from the user, e.g. forming part of sensors for monitoring physiological functions of the user, e.g. brain activity or eye movement activity or temperature.

However, as taught by the present disclosure, for own voice estimation, it may be advantageous to locate a first input transducer (e.g. a microphone or a vibration sensor) in the (preferably partially occluded part of the) ear canal. It might alternatively, or additionally, be advantageous to locate a first input transducer (e.g. a vibration sensor) on the mastoid bone, e.g. in the form of a vibration sensor contacting the skin of the user covering the mastoid bone, possibly forming part of the BTE-part, or located on a specifically adapted carrier part of the spectacle frame.

Other sensors (not shown) may be located on the spectacle frame (camera, radar, etc.).

The BTE- and ITE parts (BTE and ITE) of the hearing devices are electrically connected, either wirelessly or wired, as indicated by the dashed connection between them in FIG. 8C. The ITE part may comprise one or more input transducers (e.g. microphones) and/or a loudspeaker (cf. e.g. SPK in FIGS. 2 and 6) located in the ear canal during use. One or more of the microphones ($MIC_L$, $MIC_R$, $MIC_F$) on the spectacle frame may be 'second input transducers' in the sense of the present disclosure, i.e. be located in a 'send acoustic environment' well suited to receive air-borne sound from the user's mouth, and participate in own-voice estimation according to the present disclosure.

Instead of a spectacle frame, the carrier may be a dedicated frame for carrying the first and second hearing devices and for appropriately locating the first and second (and possible further) input transducers on the head (e.g. at the respective ears) of the user.

Figure 9:
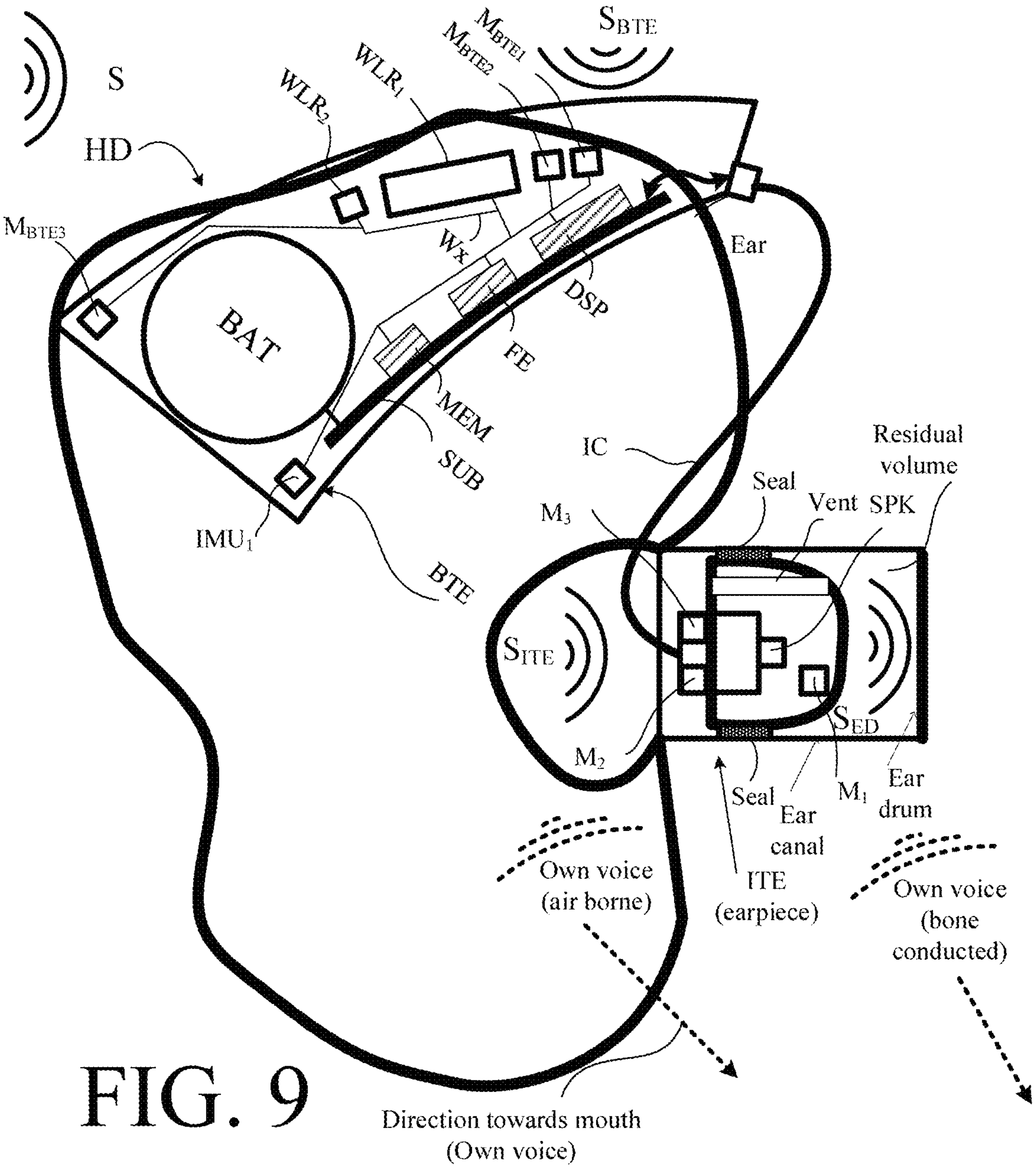
FIG. 9 shows an embodiment of a hearing aid according to the present disclosure.

FIG. 9 shows an embodiment of a hearing device, e.g. a hearing aid, according to the present disclosure. The hearing aid is here illustrated as a particular style (sometimes termed receiver-in-the ear, or RITE, style) comprising a BTE-part (BTE) adapted for being located at or behind an ear (pinna) of a user, and an ITE-part (ITE) adapted for being located in or at an ear canal of the user's ear and comprising a loudspeaker (SPK). The BTE-part and the ITE-part are connected (e.g. electrically connected) by a connecting element (IC) and internal wiring in the ITE- and BTE-parts (cf. e.g. wiring Wx in the BTE-part). The connecting element may alternatively be fully or partially constituted by a wireless link between the BTE- and ITE-parts.

In the embodiment of a hearing device in FIG. 9, the BTE part comprises an input unit comprising three input transducers (e.g. microphones) ($M_{BTE1}$, $M_{BTE2}$, $M_{BTE3}$), each for providing an electric input audio signal representative of an input sound signal ($S_{BTE}$) (originating from a sound field S around the hearing device). The input unit further comprises two wireless receivers ($WLR_1$, $WLR_2$) (or transceivers) for providing respective directly received auxiliary audio and/or control input signals (and/or allowing transmission of audio and/or control signals to other devices, e.g. a remote control or processing device). The hearing device (HD) comprises a substrate (SUB) whereon a number of electronic components are mounted, including a memory (MEM) e.g. storing different hearing aid programs (e.g. parameter settings defining such programs, or parameters of algorithms, e.g. optimized parameters of a neural network, e.g. beamformer weights of one or more (e.g. an own voice) beamformer(s)) and/or hearing aid configurations, e.g. input source combinations ($M_{BTE1}$, $M_{BTE2}$, $M_{BTE3}$, $M_1$, $M_2$, $M_3$, $WLR_1$, $WLR_2$), e.g. optimized for a number of different listening situations or modes of operation. One mode of operation may be a communication mode, where the user's own voice is picked up by microphones of the hearing aid (e.g. $M_1$, $M_2$, $M_3$) and transmitted to another device or system via one of the wireless interfaces ($WLR_1$, $WLR_2$). The substrate further comprises a configurable signal processor (DSP, e.g. a digital signal processor, e.g. including a processor (e.g. PRO in FIG. 2A, 2B) for applying a frequency and level dependent gain, e.g. providing beamforming, noise reduction, filter bank functionality, and other digital functionality of a hearing device according to the present disclosure). The configurable signal processor (DSP) is adapted to access the memory (MEM) and for selecting and processing one or more of the electric input audio signals and/or one or more of the directly received auxiliary audio input signals based on a currently selected (activated) hearing aid program/parameter setting (e.g. either automatically selected, e.g. based on one or more sensors, or selected based on inputs from a user interface). The mentioned functional units (as well as other components) may be partitioned in physical circuits and components according to the application in question (e.g. with a view to size, power consumption, analogue vs. digital processing, etc.), e.g. integrated in one or more integrated circuits, or as a combination of one or more integrated circuits and one or more separate electronic components (e.g. inductor, capacitor, etc.). The configurable signal processor (DSP) provides a processed audio signal, which is intended to be presented to a user. The substrate further comprises a front-end IC (FE) for interfacing the configurable signal processor (DSP) to the input and output transducers, etc., and typically comprising interfaces between analogue and digital signals. The input and output transducers may be individual separate components, or integrated (e.g. MEMS-based) with other electronic circuitry.

The hearing system (here, the hearing device HD) may further comprise a detector unit comprising one or more inertial measurement units (IMU), e.g. a 3D gyroscope, a 3D accelerometer and/or a 3D magnetometer, here denoted $IMU_1$ and located in the BTE-part (BTE). Inertial measurement units (IMUs), e.g. accelerometers, gyroscopes, and magnetometers, and combinations thereof, are available in a multitude of forms (e.g. multi-axis, such as 3D-versions), e.g. constituted by or forming part of an integrated circuit, and thus suitable for integration, even in miniature devices, such as hearing devices, e.g. hearing aids. The sensor $IMU_1$ may thus be located on the substrate (SUB) together with other electronic components (e.g. MEM, FE, DSP). One or more movement sensors (IMU) may alternatively or additionally be located in or on the ITE part (ITE) or in or on the connecting element (IC), e.g. used to pick up sound from the user's mouth (own voice).

The hearing device (HD) further comprises an output unit (e.g. an output transducer) providing stimuli perceivable by the user as sound based on a processed audio signal from the processor or a signal derived therefrom. In the embodiment of a hearing device in FIG. 9, the ITE part comprises the output unit in the form of a loudspeaker (also sometimes termed a 'receiver') (SPK) for converting an electric signal to an acoustic (air borne) signal, which (when the hearing device is mounted at an ear of the user) is directed towards the ear drum (Ear drum), where sound signal ($S_{ED}$) is provided (possibly including bone conducted sound from the user's mouth, and sound from the environment 'leaking around or through' the ITE-part and into the residual volume). The ITE-part further comprises a sealing and guiding element ('Seal') for guiding and positioning the ITE-part in the ear canal (Ear canal) of the user, and for separating the 'Residual volume' ($1^{st}$ acoustic environment) from the environment ($2^{nd}$ acoustic environment), cf. e.g. FIG. 1A-1E, 2A, 2B. The ITE part (earpiece) may comprise a housing or a soft or rigid or semi-rigid dome-like structure.

The electric input signals (from input transducers $M_{BTE1}$, $M_{BTE2}$, $M_{BTE3}$, $M_1$, $M_2$, $M_3$, $IMU_1$) may be processed in the time domain or in the (time-) frequency domain (or partly in the time domain and partly in the frequency domain as considered advantageous for the application in question).

The hearing device (HD) exemplified in FIG. 9 is a portable device and further comprises a battery (BAT), e.g. a rechargeable battery, e.g. based on Li-Ion battery technology, e.g. for energizing electronic components of the BTE- and possibly ITE-parts. In an embodiment, the hearing device, e.g. a hearing aid, is adapted to provide a frequency dependent gain and/or a level dependent compression and/or a transposition (with or without frequency compression) of one or more frequency ranges to one or more other frequency ranges, e.g. to compensate for a hearing impairment of a user.

Figure 10:
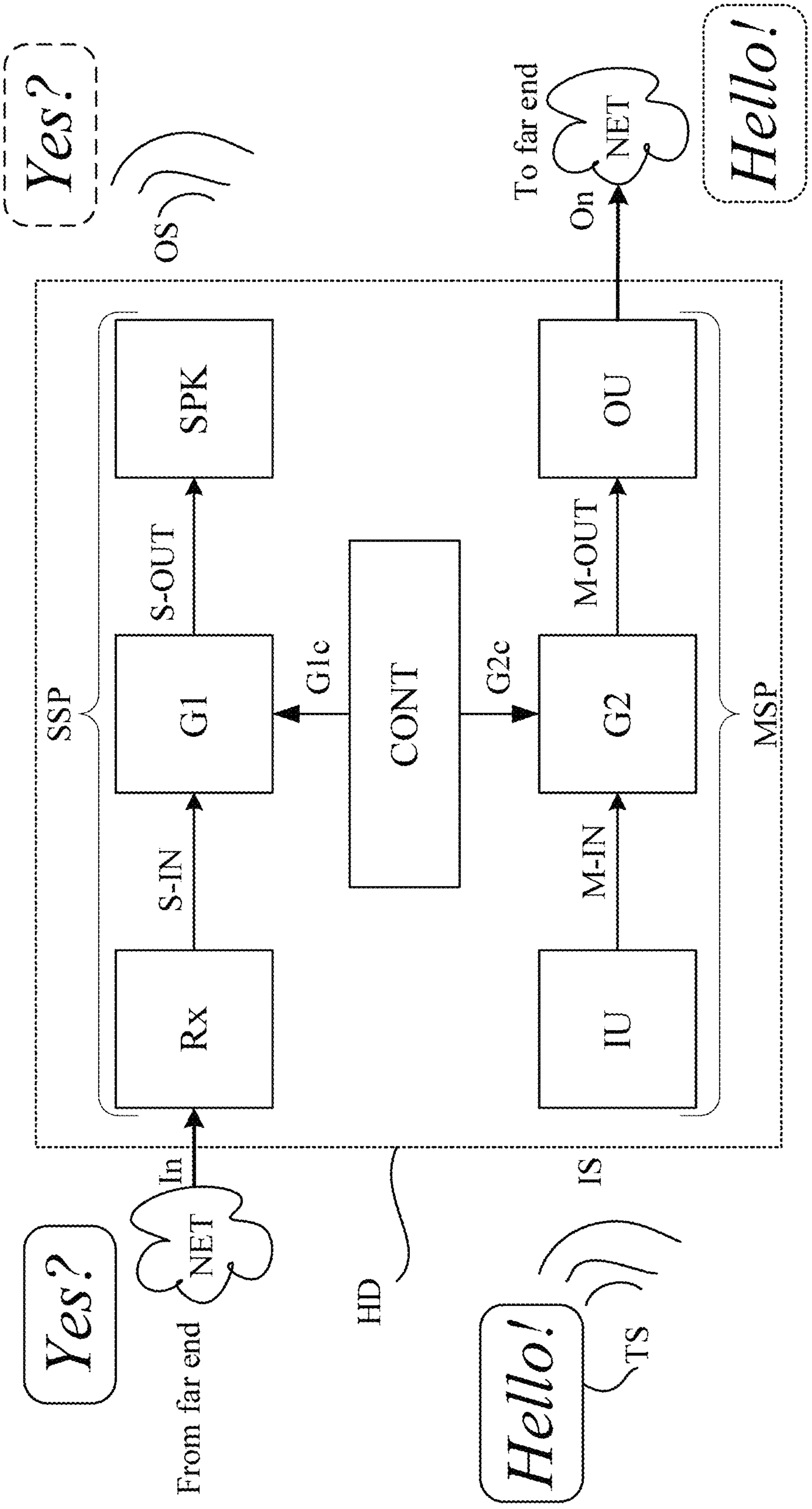
FIG. 10 shows an embodiment of a headset according to the present disclosure.

FIG. 10 shows an embodiment of a hearing device (HD), e.g. a headset, according to the present disclosure. The headset of FIG. 10 comprises a loudspeaker signal path (SSP), a microphone signal path (MSP), and a control unit (CONT) for dynamically controlling signal processing of the two signal paths. The loudspeaker signal path (SSP) comprises a receiver unit (Rx) for receiving an electric signal (In) from a remote device and providing it as an electric received input signal (S-IN), an SSP-signal processing unit (G1) for processing the electric received input signal (S-IN) and providing a processed output signal (S-OUT), and a loudspeaker unit (SPK) operationally connected to each other and configured to convert the processed output signal (S-OUT) to an acoustic sound signal (OS) originating from the signal (In) received by the receiver unit (IU). The microphone signal path (MSP) comprises an input unit (IU) comprising at least first and second microphones for converting an acoustic input sound (IS) (e.g. from a wearer of the headset) to respective electric input signals (M-IN), an MSP-signal processing unit (G2) for processing the electric microphone input signals (M-IN) and providing a processed output signal (M-OUT), and a transmitter unit (Tx) operationally connected to each other and configured to transmit the processed signal (M-OUT) originating from an input sound (IS) (e.g. comprising the user's own voice) picked up by the input unit (IU) to a remote end as a transmitted signal (On). The control unit (CONT) is configured to dynamically control the processing of the SSP- and MSP-signal processing units (G1 and G2, respectively), e.g. based on one or more control input signals (not shown).

The input signals (S-IN, M-IN) to the headset (HD) may be presented in the (time-) frequency domain or converted from the time domain to the (time-) frequency domain by appropriate functional units, e.g. included in receiver unit (Rx) and input unit (IU) of the headset. A headset according to the present disclosure may e.g. comprise a multitude of time to time time-frequency conversion units (e.g. one for each input signal that is not otherwise provided in a time-frequency representation, e.g. analysis filter bank units (A-FB) of FIG. 5B) to provide each input signal in a number of frequency bands k and a number of time instances m (the entity (k, m) being defined by corresponding values of indices k and m being termed a TF-bin or DFT-bin or TF-unit.

The headset (HD) is configured to provide an estimate of the user's own voice as disclosed in the present application. The MSP-signal processing unit (G2) may e.g. comprise an own voice beamformer as described in the present disclosure (see e.g. FIG. 7A-7C). The input transducers may e.g. be located on the headset as disclosed in the present application, e.g. as proposed in FIG. 1A-1E, FIG. 2A, 2B, FIG. 3, FIG. 4A-4E.

It is intended that the structural features of the devices described above, either in the detailed description and/or in the claims, may be combined with steps of the method, when appropriately substituted by a corresponding process.

As used, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will also be understood that when an element is referred to as being "connected" or "coupled" to another element, it can be directly connected or coupled to the other element but an intervening element may also be present, unless expressly stated otherwise. Furthermore, "connected" or "coupled" as used herein may include wirelessly connected or coupled. As used herein, the term "and/or" includes any and all combinations of one or more of the associated listed items. The steps of any disclosed method is not limited to the exact order stated herein, unless expressly stated otherwise.

It should be appreciated that reference throughout this specification to "one embodiment" or "an embodiment" or "an aspect" or features included as "may" means that a particular feature, structure or characteristic described in connection with the embodiment is included in at least one embodiment of the disclosure. Furthermore, the particular features, structures or characteristics may be combined as suitable in one or more embodiments of the disclosure. The previous description is provided to enable any person skilled in the art to practice the various aspects described herein. Various modifications to these aspects will be readily apparent to those skilled in the art, and the generic principles defined herein may be applied to other aspects.

The claims are not intended to be limited to the aspects shown herein but are to be accorded the full scope consistent with the language of the claims, wherein reference to an element in the singular is not intended to mean "one and only one" unless specifically so stated, but rather "one or more." Unless specifically stated otherwise, the term "some" refers to one or more.

Accordingly, the scope should be judged in terms of the claims that follow.

REFERENCES

EP3328097A1 (Oticon A/S) 30 May 2018

The invention claimed is:

1. A hearing device adapted to be worn by a user and for picking up sound containing the user's own voice, the hearing device comprising:

an input unit comprising first and second input transducers for converting sound to first and second electric input signals, respectively, representing said sound;

wherein said hearing device is configured to provide that said first and second input transducers are located on said user so that the user experiences first and second, acoustically different, acoustic environments, respectively, when the user wears the hearing device; and further comprising a processor connected to the input unit;

wherein the processor comprises one or more beamformers, each providing a spatially filtered signal by filtering and summing at least the first and second electric input signals; and one of the beamformers is an own voice beamformer and wherein the spatially filtered signal comprises an estimate of the user's own voice.

2. A hearing device according to claim 1, wherein the first acoustic environment is defined as an environment where the own voice signal primarily originates from vibrating parts of the bones and skin or tissue.

3. A hearing device according to claim 2, wherein more than 50% of the own voice signal originates from vibrating parts of the bones and skin or tissue.

4. A hearing device according to claim 2, wherein an airborne transmission channel exists between said vibrating parts and said first input transducer.

5. A hearing device according to claim 4, wherein said airborne transmission channel between said vibrating parts and said first input transducer is between 0 and 10 mm long.

6. A hearing device according to claim 1, wherein the second acoustic environment is defined as an environment where the own voice signal primarily originates from the user's mouth or nose and is transmitted through air from said mouth or nose to the second input transducer(s).

7. A hearing device according to claim 1 comprising an in the ear (ITE-) part that fully or partially acoustically blocks the ear canal between the first and second acoustic environments.

8. A hearing device according to claim 1, wherein the first and second acoustic environments are acoustically different from each other in that the first and second acoustic environments are separated by one or more objects that prohibit or diminish exchange of acoustic energy between them.

9. A hearing device according to claim 1, wherein the first and second acoustic environments are acoustically different from each other in that the first and second acoustic environments are at least partially isolated from each other.

10. A hearing device according to claim 9, wherein the first and second acoustic environments are separated by an object for attenuating acoustic transmission between the first and second acoustic environments.

11. A hearing device according to claim 10, wherein said object comprises a seal.

12. A hearing device according to claim 1, wherein the first and second acoustic environments are acoustically different from each other in that a transition region between the first and second acoustic environments is implemented by a minimum distance in the ear canal between the first and second input transducers.

13. A hearing device according to claim 12, wherein said minimum distance in the ear canal between the first and second input transducers is in the region between 5 mm and 20 mm.

14. A hearing device according to claim 12, wherein said transition region between the first and second acoustic environments is configured to change the acoustic conditions of an acoustic signal impinging on an input transducer located on each side of the transition region.

15. A hearing device according to claim 14, wherein said change of the acoustic conditions of an acoustic signal impinging on an input transducer located on each side of the transition region comprises a change of its directional properties, and/or its spectral properties, and/or its signal-to-noise-ratio (SNR).

16. A hearing device according to claim 12, wherein said transition region between the first and second acoustic environments is implemented by an object which fully or partially occludes the ear canal.

17. A hearing device according to claim 14, wherein said object comprises a sealing element.

18. A hearing device according to claim 17, wherein said sealing element comprises one or more openings allowing a certain exchange of air and sound with the environment to decrease a sense of occlusion by the user.

19. A hearing device according to claim 1 wherein, the processor is configured to receive the first and second electric input signals and to provide a combined signal as a linear combination of the first and second electric input signals, wherein the combined signal comprises an estimate of the user's own voice.

20. A hearing device according to claim 1, wherein said first and second input transducer comprises at least one microphone.

21. A hearing device according to claim 1, wherein said first and second input transducer comprises at least one vibration sensor.

22. A hearing device according to claim 1 comprising a hearing aid, a headset, an earphone or headphone, an ear protection device or a combination thereof.

23. A method of operating a hearing device adapted to be worn by a user and for picking up sound containing the user's own voice, the hearing device comprising:

an input unit comprising first and second input transducers for converting sound to first and second electric input signals, respectively, representing said sound; and a processor connected to the input unit, the processor comprising one or more beamformers, the method comprising:

providing that said first and second input transducers are located on said user so that the user experiences first and second, acoustically different, acoustic environments, respectively, when the user wears the hearing device; and providing from each beamformer a spatially filtered signal by filtering and summing at least the first and second electric input signals, wherein one of the beamformers is an own voice beamformer and wherein the spatially filtered signal comprises an estimate of the user's own voice.

24. A method according to claim 23, wherein the first acoustic environment is defined as an environment where the own voice signal primarily originates from vibrating parts of the bones and skin or tissue, and wherein the second acoustic environment is defined as an environment where the own voice signal primarily originates from the user's mouth or nose and is transmitted through air from said mouth or nose to the second input transducer(s).

25. A method according to claim 23, wherein the first and second acoustic environments are acoustically different from each other in that the first and second acoustic environments are separated by one or more objects that prohibit or diminish exchange of acoustic energy between them.

26. A method according to claim 23 configured to process the first and second electric input signals and to provide a combined signal as a linear combination of the first and second electric input signals, wherein the combined signal comprises an estimate of the user's own voice.

* * * * *